United States Patent
Aronson et al.

(10) Patent No.: US 10,291,324 B2
(45) Date of Patent: *May 14, 2019

(54) METHOD OF MONITORING AN OPTOELECTRONIC TRANSCEIVER WITH MULTIPLE FLAG VALUES FOR A RESPECTIVE OPERATING CONDITION

(71) Applicant: Finisar Corporation, Sunnyvale, CA (US)

(72) Inventors: Lewis B. Aronson, Sunnyvale, CA (US); Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,659

(22) Filed: Feb. 21, 2017

(65) Prior Publication Data

US 2017/0163346 A1    Jun. 8, 2017

Related U.S. Application Data

(63) Continuation of application No. 14/936,642, filed on Nov. 9, 2015, now Pat. No. 9,577,759, which is a
(Continued)

(51) Int. Cl.
*H04B 10/04* (2006.01)
*H04B 10/40* (2013.01)
(Continued)

(52) U.S. Cl.
CPC ............. *H04B 10/40* (2013.01); *G01M 11/00* (2013.01); *G01M 11/30* (2013.01);
(Continued)

(58) Field of Classification Search
CPC .... H04B 10/40; H04B 10/0799; H04B 10/07; H04B 2210/08; G01M 99/002; G01M 11/30; G01M 11/00
(Continued)

(56) References Cited

U.S. PATENT DOCUMENTS 3,646,329 A    2/1972    Yoshino et al.
4,162,531 A    7/1979    Rode et al.
(Continued)

FOREIGN PATENT DOCUMENTS

EP    0061034 B1    8/1985
EP    0482392 A2    4/1992
(Continued)

OTHER PUBLICATIONS

Finisar Corporation, Intention to Grant, EP 05737559.4, dated Aug. 21, 2017, 5 pgs.
(Continued)

*Primary Examiner* — Mohammad R Sedighian
(74) *Attorney, Agent, or Firm* — Morgan, Lewis & Bockius LLP

(57) ABSTRACT

An optoelectronic transceiver includes an optoelectronic transmitter, an optoelectronic receiver, memory, and an interface. The memory is configured to store digital values representative of operating conditions of the optoelectronic transceiver. The interface is configured to receive from a host a request for data associated with a particular memory address, and respond to the host with a specific digital value of the digital values. The specific digital value is associated with the particular memory address received from the host. The optoelectronic transceiver may further include comparison logic configured to compare the digital values with limit values to generate flag values, wherein the flag values are stored as digital values in the memory.

43 Claims, 8 Drawing Sheets

Related U.S. Application Data continuation of application No. 14/494,823, filed on Sep. 24, 2014, now Pat. No. 9,184,850, which is a continuation of application No. 13/948,082, filed on Jul. 22, 2013, now Pat. No. 8,849,123, which is a continuation of application No. 13/336,963, filed on Dec. 23, 2011, now Pat. No. 8,515,284, which is a continuation of application No. 12/400,752, filed on Mar. 9, 2009, now Pat. No. 8,086,100, which is a continuation of application No. 11/679,800, filed on Feb. 27, 2007, now Pat. No. 7,502,564, which is a continuation of application No. 10/657,554, filed on Sep. 4, 2003, now Pat. No. 7,184,668, which is a continuation of application No. 10/266,869, filed on Oct. 8, 2002, now Pat. No. 7,058,310, which is a continuation-in-part of application No. 09/777,917, filed on Feb. 5, 2001, now Pat. No. 7,079,775.

(51) Int. Cl.
  *G01M 11/00* (2006.01)
  *G01M 99/00* (2011.01)
  *H04B 10/079* (2013.01)
  *H04B 10/07* (2013.01)

(52) U.S. Cl.
  CPC .......... *G01M 99/002* (2013.01); *H04B 10/07* (2013.01); *H04B 10/0799* (2013.01); *H04B 2210/08* (2013.01)

(58) Field of Classification Search
  USPC ........................................................ 398/25
  See application file for complete search history.

(56) References Cited

U.S. PATENT DOCUMENTS

| | | |
|---|---|---|
| 4,192,005 A | 3/1980 | Kurtz |
| 4,273,413 A | 6/1981 | Bendiksen et al. |
| 4,315,210 A | 2/1982 | Michel et al. |
| 4,329,600 A | 5/1982 | Stewart |
| 4,414,480 A | 11/1983 | Zasio |
| 4,509,130 A | 4/1985 | Menzies et al. |
| 4,523,089 A | 6/1985 | Maeda et al. |
| 4,545,078 A | 10/1985 | Wiedeburg |
| 4,547,039 A | 10/1985 | Caron et al. |
| 4,549,124 A | 10/1985 | Beier |
| 4,559,616 A | 12/1985 | Bruder |
| 4,580,044 A | 4/1986 | Hongo et al. |
| 4,592,057 A | 5/1986 | Comerford |
| 4,597,631 A | 7/1986 | Flores |
| 4,612,670 A | 9/1986 | Henderson |
| 4,612,671 A | 9/1986 | Giles |
| 4,627,080 A | 12/1986 | Debus, Jr. |
| 4,647,148 A | 3/1987 | Katagiri |
| 4,663,760 A | 5/1987 | Shimada et al. |
| 4,680,487 A | 7/1987 | Kobayashi |
| 4,685,097 A | 8/1987 | van der Put |
| 4,687,924 A | 8/1987 | Galvin et al. |
| 4,691,127 A | 9/1987 | Huizer |
| 4,707,067 A | 11/1987 | Haberland et al. |
| 4,707,620 A | 11/1987 | Sullivan et al. |
| 4,715,003 A | 12/1987 | Keller et al. |
| 4,719,369 A | 1/1988 | Asano et al. |
| 4,728,881 A | 3/1988 | Evans et al. |
| 4,734,914 A | 3/1988 | Yoshikawa |
| 4,747,091 A | 5/1988 | Doi |
| 4,765,188 A | 8/1988 | Krechmery et al. |
| 4,779,013 A | 10/1988 | Tanaka |
| 4,809,286 A | 2/1989 | Kollanyi et al. |
| 4,859,877 A | 8/1989 | Cooperman et al. |
| 4,860,198 A | 8/1989 | Takenaka |
| 4,872,080 A | 10/1989 | Hentschel et al. |
| 4,878,225 A | 10/1989 | Aiba et al. |
| 4,890,288 A | 12/1989 | Inuyama et al. |
| 4,894,562 A | 1/1990 | Cavaliere et al. |
| 4,903,273 A | 2/1990 | Bathe |
| 4,912,521 A | 3/1990 | Almquist et al. |
| 4,916,707 A | 4/1990 | Rosenkranz |
| 4,918,681 A | 4/1990 | Ikeda |
| 4,932,038 A | 6/1990 | Windus |
| 4,939,389 A | 7/1990 | Cox et al. |
| 4,958,520 A | 9/1990 | Trommler et al. |
| 4,967,105 A | 10/1990 | Akamatsu et al. |
| 4,977,333 A | 12/1990 | Suzuki et al. |
| 4,992,724 A | 2/1991 | Hisanaga et al. |
| 5,005,939 A | 4/1991 | Arvanitakis et al. |
| 5,019,769 A | 5/1991 | Levinson |
| 5,023,488 A | 6/1991 | Gunning |
| 5,024,101 A | 6/1991 | Tanaka et al. |
| 5,029,272 A | 7/1991 | Fourcroy et al. |
| 5,039,194 A | 8/1991 | Block et al. |
| 5,045,730 A | 9/1991 | Cooperman et al. |
| 5,045,832 A | 9/1991 | Tam |
| 5,046,138 A | 9/1991 | Grub, III |
| 5,047,835 A | 9/1991 | Chang |
| 5,055,715 A | 10/1991 | Inaba |
| 5,057,932 A | 10/1991 | Lang |
| 5,069,522 A | 12/1991 | Block et al. |
| 5,073,838 A | 12/1991 | Ames |
| 5,075,569 A | 12/1991 | Branson |
| 5,081,379 A | 1/1992 | Korteling |
| 5,097,148 A | 3/1992 | Gabara |
| 5,107,230 A | 4/1992 | King |
| 5,117,130 A | 5/1992 | Shoji |
| 5,117,476 A | 5/1992 | Yingst et al. |
| 5,118,971 A | 6/1992 | Schenck |
| 5,121,064 A | 6/1992 | Eller |
| 5,122,893 A | 6/1992 | Tolbert |
| 5,134,311 A | 7/1992 | Biber et al. |
| 5,136,410 A | 8/1992 | Heiling et al. |
| 5,165,046 A | 11/1992 | Hesson |
| 5,185,538 A | 2/1993 | Kondoh et al. |
| 5,194,765 A | 3/1993 | Dunlop et al. |
| 5,195,154 A | 3/1993 | Uchida |
| 5,199,884 A | 4/1993 | Kaufman et al. |
| 5,202,943 A | 4/1993 | Carden et al. |
| 5,206,546 A | 4/1993 | Usami |
| 5,224,866 A | 7/1993 | Nakamura et al. |
| 5,228,064 A | 7/1993 | Viviano |
| 5,230,638 A | 7/1993 | DiVesti |
| 5,237,214 A | 8/1993 | Usami |
| 5,243,678 A | 9/1993 | Schaffer et al. |
| 5,254,883 A | 10/1993 | Horowitz et al. |
| 5,268,949 A | 12/1993 | Watanabe et al. |
| 5,278,404 A | 1/1994 | Yeates |
| 5,296,756 A | 3/1994 | Patel et al. |
| 5,334,826 A | 8/1994 | Sato et al. |
| 5,345,230 A | 9/1994 | Jackson et al. |
| 5,383,208 A | 1/1995 | Queniat et al. |
| 5,387,824 A | 2/1995 | Michelsen |
| 5,392,273 A | 2/1995 | Masaki et al. |
| 5,396,059 A | 3/1995 | Yeates |
| 5,448,629 A | 9/1995 | Bosch et al. |
| 5,457,407 A | 10/1995 | Shu et al. |
| 5,477,541 A | 12/1995 | White et al. |
| 5,479,288 A | 12/1995 | Ishizuka et al. |
| 5,506,922 A | 4/1996 | Grois et al. |
| 5,510,924 A | 4/1996 | Terui et al. |
| 5,515,361 A | 5/1996 | Li et al. |
| 5,515,468 A | 5/1996 | DeAndrea et al. |
| 5,517,505 A | 5/1996 | Buchholz et al. |
| 5,526,160 A | 6/1996 | Watanabe et al. |
| 5,526,164 A | 6/1996 | Link et al. |
| 5,546,042 A | 8/1996 | Tedrow et al. |
| 5,553,237 A | 9/1996 | Eisenberg et al. |
| 5,557,437 A | 9/1996 | Sakai et al. |
| 5,568,068 A | 10/1996 | Ota et al. |
| 5,574,435 A | 11/1996 | Mochizuki |
| 5,576,877 A | 11/1996 | Aulet et al. |
| 5,578,960 A | 11/1996 | Matsumara et al. |
| 5,594,748 A | 1/1997 | Jabr |
| 5,596,285 A | 1/1997 | Marbot et al. |

(56) References Cited

U.S. PATENT DOCUMENTS

| | | | |
|---|---|---|---|
| 5,596,663 A | 1/1997 | Ishibashi et al. |
| 5,604,757 A | 2/1997 | Liang et al. |
| 5,604,758 A | 2/1997 | AuYeung et al. |
| 5,619,430 A | 4/1997 | Nolan et al. |
| 5,623,355 A | 4/1997 | Olsen |
| 5,659,459 A | 8/1997 | Wakabayashi et al. |
| 5,668,468 A | 9/1997 | Cargill |
| 5,673,282 A | 9/1997 | Wurst |
| 5,684,421 A | 11/1997 | Chapman et al. |
| 5,717,533 A | 2/1998 | Poplawski et al. |
| 5,734,558 A | 3/1998 | Poplawski et al. |
| 5,734,672 A | 3/1998 | McMinn et al. |
| 5,745,409 A | 4/1998 | Wong et al. |
| 5,748,672 A | 5/1998 | Smith et al. |
| 5,761,216 A | 6/1998 | Sotome et al. |
| 5,801,866 A | 9/1998 | Chan et al. |
| 5,812,572 A * | 9/1998 | King ............... H01S 5/06213 372/26 |
| 5,822,099 A | 10/1998 | Takamatsu |
| 5,831,929 A | 11/1998 | Manning |
| 5,838,177 A | 11/1998 | Keeth |
| 5,844,928 A | 12/1998 | Shastri et al. |
| 5,852,378 A | 12/1998 | Keeth |
| 5,854,704 A | 12/1998 | Grandpierre |
| 5,860,080 A | 1/1999 | James et al. |
| 5,862,094 A | 1/1999 | Kawabata et al. |
| 5,870,347 A | 2/1999 | Keeth et al. |
| 5,872,736 A | 2/1999 | Keeth |
| 5,887,254 A | 3/1999 | Halonen |
| 5,892,981 A | 4/1999 | Wiggers |
| 5,910,920 A | 6/1999 | Keeth |
| 5,920,518 A | 7/1999 | Harrison et al. |
| 5,926,034 A | 7/1999 | Seyyedy |
| 5,926,303 A | 7/1999 | Giebel et al. |
| 5,935,263 A | 8/1999 | Keeth et al. |
| 5,940,608 A | 8/1999 | Manning |
| 5,940,609 A | 8/1999 | Harrison |
| 5,943,152 A | 8/1999 | Mizrahi et al. |
| 5,945,819 A | 8/1999 | Ursino et al. |
| 5,946,244 A | 8/1999 | Manning |
| 5,946,260 A | 8/1999 | Manning |
| 5,949,254 A | 9/1999 | Keeth |
| 5,953,690 A | 9/1999 | Lemon et al. |
| 5,956,168 A | 9/1999 | Levinson et al. |
| 5,959,481 A | 9/1999 | Donnelly et al. |
| 5,959,929 A | 9/1999 | Cowles et al. |
| 5,963,502 A | 10/1999 | Watanabe et al. |
| 5,977,797 A | 11/1999 | Gasparik |
| 5,986,955 A | 11/1999 | Siek et al. |
| 5,987,628 A | 11/1999 | Von Bokern et al. |
| 5,996,043 A | 11/1999 | Manning |
| 5,999,549 A | 12/1999 | Freitag et al. |
| 6,000,022 A | 12/1999 | Manning |
| 6,010,538 A | 1/2000 | Sun et al. |
| 6,011,732 A | 1/2000 | Harrison et al. |
| 6,014,241 A | 1/2000 | Winter et al. |
| 6,014,759 A | 1/2000 | Manning |
| 6,016,282 A | 1/2000 | Keeth |
| 6,020,593 A | 2/2000 | Chow et al. |
| 6,021,947 A | 2/2000 | Swartz |
| 6,023,147 A | 2/2000 | Cargin, Jr. et al. |
| 6,026,050 A | 2/2000 | Baker et al. |
| 6,026,051 A | 2/2000 | Keeth et al. |
| 6,028,451 A | 2/2000 | Ruff |
| 6,029,250 A | 2/2000 | Keeth |
| 6,029,252 A | 2/2000 | Manning |
| 6,031,787 A | 2/2000 | Jeddeloh |
| 6,032,220 A | 2/2000 | Martin et al. |
| 6,032,274 A | 2/2000 | Manning |
| 6,034,878 A | 3/2000 | Osaka et al. |
| 6,047,346 A | 4/2000 | Lau et al. |
| 6,049,413 A | 4/2000 | Taylor et al. |
| 6,064,501 A | 5/2000 | Roberts et al. |
| 6,072,747 A | 6/2000 | Yoon |
| 6,087,893 A | 7/2000 | Oowaki et al. |
| 6,094,075 A | 7/2000 | Garrett, Jr. et al. |
| 6,097,746 A | 8/2000 | Noda et al. |
| 6,108,114 A | 8/2000 | Gilliland et al. |
| 6,115,113 A | 9/2000 | Flockencier |
| H1881 H | 10/2000 | Davis et al. |
| RE36,886 E | 10/2000 | Ishibashi et al. |
| 6,160,647 A | 12/2000 | Gilliland et al. |
| 6,175,434 B1 | 1/2001 | Feng |
| 6,205,505 B1 | 3/2001 | Jau et al. |
| 6,222,660 B1 | 4/2001 | Traa |
| 6,256,127 B1 | 7/2001 | Taylor |
| 6,282,216 B1 | 8/2001 | Ikeuchi et al. |
| 6,294,934 B1 | 9/2001 | Garrett, Jr. et al. |
| 6,317,804 B1 | 11/2001 | Levy et al. |
| 6,321,282 B1 | 11/2001 | Horowitz et al. |
| 6,359,938 B1 | 3/2002 | Keevill et al. |
| 6,423,963 B1 | 7/2002 | Wu |
| 6,442,644 B1 | 8/2002 | Gustavson et al. |
| 6,449,075 B1 | 9/2002 | Watson et al. |
| 6,462,591 B2 | 10/2002 | Garrett, Jr. et al. |
| 6,463,392 B1 | 10/2002 | Nygaard et al. |
| 6,473,224 B2 | 10/2002 | Dugan et al. |
| 6,512,617 B1 | 1/2003 | Tanji et al. |
| 6,516,365 B2 | 2/2003 | Horowitz et al. |
| 6,526,076 B2 | 2/2003 | Cham et al. |
| 6,539,036 B2 | 3/2003 | Lehr et al. |
| 6,556,052 B2 | 4/2003 | Garrett, Jr. et al. |
| 6,608,507 B2 | 8/2003 | Garrett, Jr. et al. |
| 6,631,146 B2 | 10/2003 | Pontis et al. |
| 6,661,836 B1 | 12/2003 | Dalal et al. |
| 6,684,263 B2 | 1/2004 | Horowitz et al. |
| 6,694,462 B1 | 2/2004 | Reiss et al. |
| 6,711,189 B1 | 3/2004 | Gilliland et al. |
| 6,748,181 B2 | 6/2004 | Miki et al. |
| 6,802,654 B1 | 10/2004 | Roberts et al. |
| 6,826,658 B1 | 11/2004 | Gaither et al. |
| 6,850,398 B2 | 2/2005 | Ciancio |
| 6,862,302 B2 | 3/2005 | Chieng et al. |
| 6,937,949 B1 | 8/2005 | Fishman et al. |
| 6,941,077 B2 | 9/2005 | Aronson et al. |
| 6,952,531 B2 | 10/2005 | Aronson et al. |
| 6,957,021 B2 | 10/2005 | Aronson et al. |
| 6,975,642 B2 | 12/2005 | Levinson et al. |
| 7,050,720 B2 | 5/2006 | Aronson et al. |
| 7,058,310 B2 | 6/2006 | Aronson et al. |
| 7,079,775 B2 * | 7/2006 | Aronson ............... G01M 11/00 398/135 |
| 7,162,160 B2 | 1/2007 | Aronson et al. |
| 7,184,668 B2 * | 2/2007 | Aronson ............... G01M 11/00 398/137 |
| 7,233,027 B2 | 6/2007 | Neumeuer et al. |
| RE40,150 E | 3/2008 | Ishibashi et al. |
| RE40,154 E | 3/2008 | Ishibashi et al. |
| 7,474,630 B2 | 1/2009 | Huang et al. |
| 7,502,564 B2 * | 3/2009 | Aronson ............... G01M 11/00 398/137 |
| 7,574,540 B2 | 8/2009 | Robillard et al. |
| 7,574,630 B1 | 8/2009 | Ranaweera et al. |
| 7,653,840 B1 | 1/2010 | Taylor et al. |
| 8,086,100 B2 * | 12/2011 | Aronson ............... G01M 11/00 398/135 |
| 8,159,956 B2 | 4/2012 | Ray Noble et al. |
| 8,515,284 B2 * | 8/2013 | Aronson ............... G01M 11/00 398/135 |
| 8,849,123 B2 * | 9/2014 | Aronson ............... G01M 11/00 398/135 |
| 9,184,850 B2 * | 11/2015 | Aronson ............... G01M 11/00 |
| 9,577,759 B2 * | 2/2017 | Aronson ............... G01M 11/00 |
| 2002/0021468 A1 | 2/2002 | Kato et al. |
| 2002/0027688 A1 | 3/2002 | Stephenson |
| 2002/0060824 A1 | 5/2002 | Liou et al. |
| 2002/0097468 A1 | 7/2002 | Mecherle et al. |
| 2002/0101641 A1 | 8/2002 | Kurchuk |
| 2002/0105982 A1 | 8/2002 | Chin et al. |
| 2002/0149821 A1 | 10/2002 | Aronson et al. |
| 2002/0181519 A1 | 12/2002 | Vilhelmsson et al. |
| 2002/0181894 A1 | 12/2002 | Gilliland et al. |
| 2003/0053170 A1 | 3/2003 | Levinson et al. |
| 2003/0113118 A1 | 6/2003 | Bartur |

(56) References Cited

U.S. PATENT DOCUMENTS

| | | |
|---|---|---|
| 2003/0210917 A1 | 11/2003 | Stewart et al. |
| 2004/0076113 A1 | 4/2004 | Aronson et al. |
| 2004/0120720 A1 | 6/2004 | Chang et al. |
| 2004/0122607 A1 | 6/2004 | Fishman et al. |
| 2004/0153913 A1 | 8/2004 | Fishman et al. |
| 2004/0202210 A1 | 10/2004 | Thornton |
| 2004/0240886 A1 | 12/2004 | Aronson et al. |
| 2004/0253003 A1 | 12/2004 | Farmer et al. |
| 2005/0058455 A1 | 3/2005 | Aronson et al. |
| 2005/0246568 A1 | 11/2005 | Davies |
| 2006/0251087 A1 | 11/2006 | Ng et al. |
| 2007/0189174 A1 | 8/2007 | Hibbert |
| 2007/0189175 A1 | 8/2007 | Vedanabhatla et al. |
| 2007/0189176 A1 | 8/2007 | Milne et al. |
| 2008/0187033 A1 | 8/2008 | Smith |
| 2008/0189641 A1 | 8/2008 | Kotturu et al. |
| 2008/0253293 A1 | 10/2008 | Beyers |
| 2011/0161728 A1 | 6/2011 | Kano et al. |

FOREIGN PATENT DOCUMENTS

| | | |
|---|---|---|
| EP | 1168687 A2 | 1/2002 |
| EP | 1471671 A2 | 10/2004 |
| JP | 58-140175 | 8/1983 |
| JP | 62-124576 A | 6/1987 |
| JP | 62-235975 A | 10/1987 |
| JP | 62-281485 A | 12/1987 |
| JP | 2-102589 A | 4/1990 |
| JP | 4-023373 A | 1/1992 |
| JP | 1994-097548 | 4/1994 |
| JP | 6-504405 T | 5/1994 |
| JP | 6-209209 | 7/1994 |
| JP | 9-162811 A | 6/1997 |
| JP | 2002-191821 | 7/2002 |
| WO | WO 93/21706 A1 | 10/1993 |
| WO | WO 98/00893 A1 | 1/1998 |
| WO | WO 98/00943 A1 | 1/1998 |
| WO | WO 02/063800 A1 | 8/2002 |
| WO | WO 2004/013991 A1 | 2/2004 |
| WO | WO 2004/098100 A2 | 11/2004 |

OTHER PUBLICATIONS

21 CFR Chapter 1, 1040.10, Apr. 1, 2009, 23 pgs.
Acarlar, A High Speed Surface Mount Optical Data Link for Military Applications, IEEE Xplore, 1990, pp. 297-302.
ADC Fiber Optic Transceiver Evaluation Kit Advertisement, International Fiber Optics and Communications, Sep. 1986, 1 pg.
AMP, One-Piece Printed Circuit Board Connectors, Interconnection Systems Selection Guide 82750, Jul. 1995, 3 pgs.
Andary, The Development Test Flight of the Flight Telerobotic Servicer: Design Description and Lessons Learned, IEEE Transactions on Robotics and Automation, vol. 9, No. 5, Oct. 1993, pp. 664-674.
Annex 48B (Jitter Test Methods) Analog Target Specification, IEEE, May 2001, pp. 6-14.
Aronson, Office Action, US 200610149558948,082, dated Dec. 11, 2013, 6 pgs.
Aronson, Office Action, U.S. Appl. No. 14/936,642, dated Jan. 20, 2016, 4 pgs.
Aronson, Amendment, U.S. Appl. No. 13/948,082, dated Mar. 11, 2014, 7 pgs.
Aronson, Notice of Allowance, U.S. Appl. No. 13/948,082, dated Jun. 6, 2014, 8 pgs.
Aronson, Notice of Allowance, U.S. Appl. No. 14/494,823, dated Jul. 8, 2015, 8 pgs.
Aronson, Notice of Allowance, U.S. Appl. No. 14/936,642, dated Oct. 7, 2016, 9 pgs.
Aronson, Digital Diagnostic Monitoring Interface for Optical Transceivers, Draft Rev. 9.0, Mar. 28, 2002, 31 pgs.
Atmel, IR Receiver ASSP T2525, Product Information, Rev. 4657C-AUTO, Oct. 2003, 10 pgs.

Avella, AN/ARC-144 UHF Multimode Transceiver, Sep. 1971, pp. 14-15.
Baldwin, Fiber Optic Module Interface Attachment, Research Disclosure, No. 330, Kenneth Mason Publications Ltd, England, Oct. 1991, 1 pg.
Baumgartner, An Integrated 1.25 Gbit/s Laser Driver/ Post Amplifer IC, IEEE Customer Integrated Circuits Conference, IBM-AS/400 Division, 1997, pp. 17-20.
Bellcore, Synchronous Optical Network (SONET) Transport Systems: Common Generic Criteria GR-253-CORE, Issue 2, Dec. 1995, Revision 2, Jan. 1999, 786 pgs.
Cai, Jitter Testing for Gigabit Serial Communication Transceivers, Design & Test of Computers, IEEE, vol. 19, Issue 1, Jan.-Feb. 2002, pp. 66-74.
Chown, Integrated Transceiver for FDDI, IEEE Xplore, May 1989, pp. 378-383.
Clark, The PCB Connector as a Surface Mounted Device, IEEE Transactions on Components, Hybrids, and Manufacturing Technology, vol. CHMT-8, No. 4, Dec. 1985, pp. 530-534.
Coombs, Printed Circuits Handbook, Fourth Edition, 1996, 4 pgs.
Course Schedule, Fibre Channel Group, Nov. 23, 1998, 4 pgs.
Dallas Semiconductor Maxim, DS1847 Dual Temperature-Controlled NV Variable Resistor, Jan. 18, 2006, pp. 1-17.
Dallas Semiconductor Maxim, DS1848 Dual Temperature-Controlled NV Variable Resistor & Memory, Jan. 18, 2006, pp. 1-17.
Definition of "Interface", Microsoft Press Computer Dictionary, Second Edition, 1994, 8 pgs.
Definition of "Interface", Newton's Telecom Dictionary, Eleventh Edition, 1996, 3 pgs.
Definition of "Interface", Webster's Desk Dictionary, 1995, 3 pgs.
Definition of "Location", McGraw-Hill Electronics Dictionary, Fifth Edition, 1994, 3 pgs.
Definition of "Motherboard", Fiber Optics Standard Dictionary, Third Edition, 1997, 5 pgs.
Definition of "Motherboard", IEEE 100, The Authoritative Dictionary of IEEE Standards Teens, Seventh Edition, 2000, 6 pgs.
Definition of "Mount", The American Heritage Dictionary of the English Language, Third Edition, 1996, 3 pgs.
Definition of "Surface Mount Technology", McGraw-Hill Electronics Dictionary, Fifth Edition, 1994, 9 pgs.
DLX2000 Transceiver, Fiber Optic Data Link, BT&D Technologies, May 1989, 5 pgs.
Einwaechter, Shortwave Transmitter & Receiver System FuG 101 for Telegraphy and Telephony, Siemens Review LIII, 1976, pp. 526-529.
Fairchild Semiconductor, CMOS, the Ideal Logic Family, Application Note 77, Jan. 1983, 10 pgs.
Fairhurst, Manchester Encoding, Jan. 9, 2001, 2 pgs.
Fiber Optics Standard Dictionary, Third Edition, 1997, two cover pages and p. 540.
Finisar Corp., App Note AN-2025: Using the Finisar GBIC I2C Test Diagnostics Port, 1998, 16 pgs.
*Finisar Corporation* v. *Source Photonics*, Civil Case No. CV 10-00032 WHA, Defendant and Counterclaimant Source Photonics Inc.'s Preliminary Invalidity Contentions Pursuant to Patent L.R.3-3, 39 pgs.
*Finisar Corporation* v. *Source Photonics, Inc.* Case No. CV-10-00032-WHA [Proposed] Claim Construction Order of Finisar Corporation, Document 70, Aug. 25, 2010, 3 pgs.
*Finisar Corporation* v. *Source Photonics, Inc.* Case No. CV-10-00032 WHA, Declaration of Dr. Joseph M. Kahn in Support of Finisar's Opening Claim Construction Brief, Document 68, Aug. 25, 2010, 9 pgs.
*Finisar Corporation* v. *Source Photonics, Inc.* Case No. CV-10-00032 WHA, Declaration of Paul K. Wright in Support of Source Photonics, Inc.'s Responsive Claim Construction Brief, Document 73, Sep. 8, 2010, 8 pgs.
*Finisar Corporation* v. *Source Photonics, Inc.* Case No. CV-10-00032 WHA, Defendant and Counterclaimant's Responsive Claim Construction Brief, Document 72, Sep. 8, 2010, 29 pgs.

(56) References Cited

OTHER PUBLICATIONS

*Finisar Corporation v. Source Photonics, Inc.* Case No. CV-10-00032 WHA, Finisar's Opening Claim Construction Brief Pursuant to Patent L.R. 4-5, Document 67, Aug. 25, 2010, 30 pgs.
*Finisar Corporation v. Source Photonics, Inc.* Case No. CV-10-00032 WHA Joint Claim Construction and Prehearing Statement Pursuant to Patent L.R. 4-3, Document 65, Aug. 13, 2010, 57 pgs.
Finisar Corporation, European Search Report, EP Application 02704344.7, dated Oct. 5, 2004, 4 pgs.
Finisar Corporation, European Search Report, EP Application 04777655.4, dated Jan. 24, 2008, 5 pgs.
Finisar Corporation, International Search Report, PCT/US00/28596, dated Feb. 15, 2001.
Finisar Corporation, International Search Report, PCT/US02/03226, dated May 9, 2002, 3 pgs.
Finisar Corporation, International Search Report, PCT/US04/11130, dated Oct. 12, 2004, 3 pgs.
Finisar Corporation, Office Action, CN 200610149558.1, dated Sep. 9, 2010, 9 pgs.
Finisar Corporation, Office Action, CN 200610149558.1, dated Apr. 12, 2010, 6 pgs.
Finisar Corporation, Office Action, CN 200610149558.1, dated Jun. 26, 2009, 5 pgs.
Finisar Corporation, Office Action, EP 05737559.4, 6 pgs.
Finisar Corporation, Office Action, JP Patent Application 2002-563630, dated Jul. 13, 2005, 10 pgs.
Finisar, Analyzers, Fibre Channel, GLA-2000 Gigabit Link Analyzer, Feb. 5, 1998, 1 pg.
Finisar, Application Note AN-2010: Using the Built-in Test/Diagnostics Port on FTR-XX10 Transceivers, FTM-XX10 Transmitters and FRM-XX10 Receivers, May 19, 1997, 14 pgs.
Finisar, Fibre Channel Gigabit Traffic (GT) System Provides Performance and Protocol Analysis, Data Generation and BER Testing in Portable or Desktop Configurations, Jan. 21, 1998, 4 pgs.
Finisar, Finisar Introduces Smart GBICs, Jul. 8, 1998, 3 pgs.
Finisar, GBIC Transceivers, Fibre Channel, Gigabit Ethernet, Up to 1.25 Gb/s, Sep. 11, 1999, 3 pgs.
Finisar, Gigabit Transceivers Simplify LAN Connection; Give Network Hardware Designers Choice of Coax, Multi-Mode and Single-Mode Fiber Optic Transmission, Aug. 15, 1995, 3 pgs.
Finisar, Handheld Link Status and Performance Monitor for Fibre Channel or Gigabit Ethernet From Finisar Corporation, Jul. 13, 1998, 3 pgs.
Finisar, Link Extenders, FLX-2000, Powerful Built-In Diagnostics, Feb. 5, 1998, 1 pg.
Finisar, Link Extenders, FLX-2000, Versatile Monitoring Capabilities, Feb. 5, 1998, 1 pg.
Finisar, Low-Cost Analyzer Tests Several High-Speed Gigabit Links; Provides "Parallel Bit Error Rate" and Multifunction Testing, Jul. 15, 1993, 3 pgs.
Finisar, Optic Modules, Application Note AN-2010, Communication During Open Fiber Control Protocol Sequence, Feb. 5, 1998, 2 pgs.
Finisar, Optic Modules, Application Note AN-2010, Introduction, Feb. 5, 1998, 2 pgs.
Finisar, Optic Modules, Application Note AN-2010, Network Communication with Multiple Modules, Feb. 5, 1998, 4 pgs.
Finisar, Optic Modules, Application Note AN-2010, Simplex Link Operation, Feb. 5, 1998, 1 pg.
Finisar, Optic Modules, Application Note AN-2010, Table I: FTR-XX10/FTM-XX10 Data Request Command List, Feb. 5, 1998, 2 pgs.
Finisar, Optic Modules, Application Note AN-2010, Table II: FTR-XX10/FTM-XX10 System Command List, Feb. 5, 1998, 1 pg.
Finisar, Optic Modules, FTM-8510 Transmitter/FRM-8510 Receiver, FTM/FRM-8510 Low Cost, Gigabit Fiber Optic Transmitter/Receiver, Feb. 5, 1998, 1 pg.
Finisar, Optic Modules, FTR-8510 Transceiver, FTR-8510 Low Cost, Gigabit Fiber Optic Transceiver, Feb. 5, 1998, 1 pg.
Finisar, Optical Link Extender from Finisar Corporation Lengthens Fibre Channel Connections More Than Fifteen Fold, Apr. 2, 1996, 2 pgs.
Franklin, A Hard Look at SANs, Finisar's SAN QoS reveals Fibre Channel secrets, Sep. 17, 2001, 3 pgs.
Hanson, Wiring with Plastic: A Growing Interest in High-Speed, Short Distance Communications Links is Opening a Huge Market for Plastic Optical Fibers, IEEE LTS, Feb. 1992, pp. 34-39.
Hartman, Optical Interconnection Technology in the Telecommunications Network, IEEE, 1986, pp. 464-478.
Hausdorf, Mobile Transceiver Measurements with Radiocommunication Service Monitor CMS, 1989, pp. 4-7.
Heuler, Thesis: Design, Implementation and Test of an RS-232 Compatible Bi-Directional, Full Duplex, Fiber-Optic Interface with Provision for Hardware Handshaking on a Minimum of Fiber-Optic Lines, Naval Postgraduate School, Monterey, California, Jun. 1989, 123 pgs.
Hewlett Packard HFBR-5203/-5203T, 800 nm 300 m HFBR 5204/-5204T 1300 nm 500 m HFBR-5205/-5205T 1300 nm 2 km, "ATM Multimode Fiber Transceivers for SONET OC-3/SDH STM-1 in Low Cost 1x9 Package Style," Oct. 1993, pp. 107-125.
Hewlett Packard HFBR-5301-HFBR-5302, "Fibre Channel 133 MBd and 266 MBd Transceivers in Low Cost 1x9 Package Style," Mar. 1995, pp. 215-226.
Hewlett Packard, ATM Multimode Fiber Transceivers for SONET OC-3/SDH STM-1 in Low Cost 1x9 Package Style, May 1997, 19 pgs.
Hewlett Packard, FDDI, 100 Mbps ATM, and Fast Ethernet Transceivers in Low Cost 1x9 Package Style, May 1997, 22 pgs.
Hewlett Parckard HFBR-5103/-5103T, 1300 nm 200 m HFBR 5104/-5104T 800 nm 500 m HFBR-5105/-5105T 1300 nm 500 km, "FDDI, 100 Mbps ATM and Fast Ethernet Transceivers in Low Cost 1x9 Package Style," Oct. 1993, pp. 126-147.
I2C, Webopedia.com, www.webopedia.com/TERM/I/I2C.html, Mar. 12, 2002, 1 pg.
IEEE 100, The Authoritative Dictionary of IEEE Standards Tenns, 2000, two cover pages and pp. 684-685.
ILX Lightwave Corporation, LDC3722 Laser Diode Controller, Instruction Manual, Chapters 1, 2, 3 & 4, May 25, 1990, 234 pgs.
ILX Litghtwave Corporation, LDC3722 Laser Diode Controller, Instruction Manual, Chapter 2 & 5, May 25, 1990.
Infineon Technologies, OptiPort™ SFF BIDI®-Transceiver 100 Mbit/s, 1310 nm Tx/1550 nm Rx, V23870-A 1133-Kx01, Data Sheet, Jun. 22, 2004, 1 pg.
Intel LXT16706/16707 SerDes Chipset, Product Information, 2002, 2 pgs.
Intel LXT35401XAUI-to-Quad 3.2G Transceiver, Product Information, Apr. 4, 2002, 2 pgs.
Jackson, Low-Cost Compact, Gigabit Transceivers for Data Communications, IEEE Electronic Components and Technology Conference, 1997, pp. 1-6.
Johnson, Single Chip Transceivers Help Facilitate Fibre-Channel Implementation, Computer Technology Review vol. XIX, No. 5, May 1999, 2 pgs.
MAC address, Webopedia.com, Aug. 8, 2002, 2 pg., http://www.webopedia.com/TERM/M/MAC_address.html.
Maxim Engineering Journal, Optical/Electrical Conversion in SDH/SONET Fiber Optic Systems, Special Fiber Optic Edition, 1999, 15 pgs.
Maxim Integrated Products, 622Mbps LAN/WAN Laser Driver with Automatic Power Control and Safety Shutdown, MAX3766, 1997, pp. 1-19.
Maxim, High-Efficiency, Current-Mode, Inverting PWM Controller, MAX 1846/MAX1847, Aug. 2001, 20 pgs.
Mendez, A Circuit to Provide Protection from Surge Voltages (for CB Transceiver), May 1984, 5 pgs.
Microsoft Press Computer Dictionary, Second Edition, 1994, two cover pages and p. 261.
Nagahori, 150 Mbits$^{-1}$ ch$^{-1}$ 12-channel Optical Parallel Interface Using an LED and a PD Array, Optical and Quantum Electronics 24, 1992, pp. S479-S490.
National Semiconductor, DS92LV16 Design Guide, Feb. 2002, 20 pgs.

(56) References Cited

OTHER PUBLICATIONS

National Semiconductor, LM75 Digital Temperature Sensor and Thermal Watchdog with Two-Wire Interface, Apr. 2000, 17 pgs.
National Semiconductor's Temperature Sensor Handbook, Jan. 1, 1998, 40 pgs.
National Semiconductors, LM75 Digital Temperature Sensor and Thermal Watchdog with Two-Wire Interface, 1997, 5 pgs.
National Semiconductors, LM78 Microprocessor System Hardware Monitor, Feb. 2000, pp. 1-31.
Newton's Telecom Dictionary, Eleventh Edition, 1996, two cover pages and pp. 388 and 575.
Noble, Notice of Allowance, U.S. Appl. No. 13/449,226, dated Nov. 28, 2012, 9 pgs.
Noble, Office Action, U.S. Appl. No. 13/449,226, dated Aug. 17, 2012, 12 pgs.
OCP 1×9 Duplex SC Package with EMI Shield Package Outline, Jul. 27, 2000, 3 pgs.
OCP 1×9 Package with ST & FC connector, Package Outline, May 15, 2000, 1 pg.
OCP DTC-01, OC-1 Single Mode Transceiver with Clock Recovery, Sep. 10, 1999, 5 pgs.
OCP DTC-03, OC-3/STM-1 Single Mode Transceiver with Clock Recovery, Aug. 30, 1999, 5 pgs.
OCP DTC-03-3.3, 3.3 volt OC-3/STM-1 Single Mode Transceiver with Clock Recovery, Mar. 30, 1999, 5 pgs.
OCP DTC-03-3.3-A-L0-LR1-N, OC-03/STM-1 Single Mode Transceiver, Mar. 15, 2002, 1 pg.
OCP DTC-03-3.3-S, 3.3 volt OC-3/STM-1 Single Mode Transceiver with Clock Recovery, Mar. 15, 1999, 5 pgs.
OCP DTC-03-A-L0-LR1-N, OC-03/STM-1 Single Mode Transceiver, Mar. 15, 2002, 1 pg.
OCP DTC-03-H, OC-3/STM-1 Single Mode Transceiver with Clock Recovery with Pecl Signal Dectect Output, Mar. 25, 1999, 5 pgs.
OCP DTC-03-MM, OC-3/STM-1 Multimode Transceivver with Clock Recovery & TTL Signal Detect Output, Oct. 26, 1998, 5 pgs.
OCP DTC-03-MM-H, OC-3/STM-1 Multimode Transceiver with Clock Recovery & PECL Signal Detect Output, Mar. 1, 1999, 5 pgs.
OCP DTC-12 GF2, OC-12/STM-4 "GF2" Single Mode Transceiver with Clock Recovery, Dec. 17, 1999, 4 pgs.
OCP DTC-12, OC-12/STM-4 Single Mode Transceiver with Clock Recovery, Nov. 30, 1998, 5 pgs.
OCP DTC-12-3.3, 3.3 volt OC-12/STM-4 Single Mode Transceiver with Clock Recovery, Sep. 16, 2002, 5 pgs.
OCP DTC-12-3.3, 3.3 volt OC-12/STM-4 Single Mode Transceiver with Clock Recovery, Mar. 22, 1999, 5 pgs.
OCP DTC-12-3.3-S, 3.3 volt OC-12/STM-4 Single Mode Transceiver with Clock Recovery, Oct. 15, 1999, 5 pgs.
OCP DTC-12-H, OC-12/STM-4 Single Mode Transceiver with Clock Recovery, Nov. 30, 1998, 5 pgs.
OCP DTC-12-MM, OC-12/STM-4 Multimode Transceiver with Clock Recovery, Dec. 15, 1998, 5 pgs.
OCP DTC-12-MM-T-GF2 (T is A or B temperature option), OC-12/STM-4 "GF2" Multimode Transceiver with Clock Recovery, May 26, 1999, 4 pgs.
OCP DTC-12-S, OC-12/STM-4 Single Mode Transceiver with Clock Recovery & Differential Facet Monitors, Apr. 20, 1998, 5 pgs.
OCP DTC-48, OC-48/STM-16 Single Mode Transceiver with Clock Recovery, Apr. 30, 1999, 5 pgs.
OCP DTC-48-H, OC-48/STM-16 Single Mode Transceiver with Clock Recovery, Oct. 11, 2000, 5 pgs.
OCP DTL-125 & DTL-200, Hermetically Sealed Data Link Modules, Feb. 5, 2002, 5 pgs.
OCP DTL-125 & DTL-200W, Wide Temperature Range Hermetic Data Link Modules, Oct. 15, 2001, 5 pgs.
OCP DTL-1300-F & DTL-1300-S, High Performance Hermetically Sealed Data Link Modules, Feb. 5, 2002, 5 pgs.
OCP DTL-200-RX-SW-100, Short Wavelength Hernietic Receiver, 2 pgs, Dec. 10, 1997, 2 pgs.

OCP DTL-270, Hermetically Sealed Data Link Modules at 270 Mb/s, Feb. 5, 2002, 5 pgs.
OCP DTR Multimode Transceivers, for ATM/SONET/SDH, Fibre Channel, FDDI & Fast Ethernet, Sep. 28, 1999, 9 pgs.
OCP DTR-1062-3.3-MM, 3.3 V 1×9 1.062 Gbaud Fibre Channel Shortwave Transceivers, Nov. 6, 1998, 5 pgs.
OCP DTR-1062-MM, 1×9 1.062 Gbaud Fibre Channel Shortwave Transceivers, Nov. 5, 1998, 5 pgs.
OCP DTR-1062-MM-GB & DTR-1062-3.3-MM-GB, GBIC Interface Fibre Channel 850 nm VCSEL Transceivers, Oct. 19, 1998, 5 pgs.
OCP DTR-1062-SM, 1.062 Gbaud Fibre Channel Longwave Transceiver, Sep. 15, 1998, 5 pgs.
OCP DTR-1062-SM-GB, GBIC Interface Fibre Channel Long wave Laser Transceivers, Jan. 25, 1999, 5 pgs.
OCP DTR-1250-3.3-MM-T, 3.3 V 1×9 Gigabit Ethernet 850 nm VCSEL Transceivers with TTL Signal Detect output, Sep. 4, 2002, 8 pgs.
OCP DTR-1250-3.3-SM, 3.3 V 1×9 Gigabit Ethernet 1300 & 1550 nm Laser Transceivers, Dec. 20, 2001, 5 pgs.
OCP DTR-1250-MM, 1×9 Gigabit Ethernet 850 nm VCSEL Transceivers, Sep. 23, 1998, 5 pgs.
OCP DTR-1250-MM-GB & DTR-1250-3.3-MM-GB, GBIC Interface Gigabit Ethernet 850 nm VCSEL Transceivers, Oct. 19, 1998, 5 pgs.
OCP DTR-1250-MM-LC-MR & DTR-1250-MM-LS-MR, 3.3V LC connector SFF Multi-Rate Gigabit Ethernet 850 nm VCSEL Transceivers, May 28, 2002, 6 pgs.
OCP DTR-1250-MM-LS-C-AC-M-S1-ALC, 3.3V LC connector SF Gigabit Ethernet 850 nm Laser Transceivers, Sep. 27, 2002, 1 pg.
OCP DTR-1250-MM-MR, 1×9 Gigabit Ethernet 850 nm VCSEL Multirate Transceivers, May 14, 2002, 5 pgs.
OCP DTR-1250-SM, 1×9 Gigabit Ethernet 1300 nm & 1550 nm Laser Transceivers, Dec. 1, 1998, 5 pgs.
OCP DTR-1250-SM-CWDM, 1×9 Gigabit Ethernet CWDM Laser Transceivers, Jan. 18, 2002, 5 pgs.
OCP DTR-1250-SM-GB, GBIC Interface Gigabit Ethernet 1300 & 1550 nm Laser Transceivers, May 14, 1999, 5 pgs.
OCP DTR-1250-SM-GB-CWDM, GBIC Interface Gigabit Ethernet CWDM Laser Transceivers, Jan. 9, 2002, 5 pgs.
OCP DTR-1250-SM-LC/LS-CWDM, 3.3V LC connector SFF Gigabit Ethernet CWDM Laser Transceivers, Jan. 28, 2002, 5 pgs.
OCP DTR-1250-SM-LC/LS-MR, 3.3V LC connector SFF Gigabit Ethernet 1300 nm & 1550 nm Multirate Laser Transceivers, May 16, 2002, 6 pgs.
OCP DTR-1250-SM-LS-A-H3-AC-M-S1-ALC, 3.3V LC connector SFF Gigabit Ethernet 1310 nm Laser Transceivers, Sep. 27, 2002, 1 pg.
OCP DTR-1250-SM-LS-A-H7-AC-M-S1-ALC, 3.3V LC connector SFF Gigabit Ethernet 1550 nm Laser Transceivers, Sep. 27, 2002, 2 pgs.
OCP DTR-156-3.3-SM2-A-L0-LR1-N, 3.3V 2×9 SC connector OC-03/STM-1 Single Mode Transceiver, Nov. 2, 2001, 1 pg.
OCP DTR-156-3.3-SM2-B-HP-1510, 5.0 Volt 2×9 OC-3 1510nm DFB Single Mode Transceivers, Jul. 4, 2001, 1 pg.
OCP DTR-156-3.3-SM-A-L0-LR1-N, 3.3V 1×9 SC Connector OC-3/STM-1 Single Mode Transceiver, Feb. 1, 2002, 1 pg.
OCP DTR-156-3.3-SM-A-LR2-W, 3.3 Volt Single Mode Transceivers (1×9 pin-out), Jan. 17, 2001, 1 pg.
OCP DTR-156-LS-A-ME-ALS, 2×5 Small Form Factor Multimode OC-3 LED Transceivers, May 17, 2002, 7 pgs.
OCP DTR-156-SM2-XX-A-L3-IR2, Mar. 25, 1999, 1 pg.
OCP DTR-156-SM2-XX-C-L0-LR1, Mar. 25, 1999, 1 pg.
OCP DTR-156-SM-A-L0-LR1N, OC-03/STM-1 Single Mode Transceiver, Aug. 30, 2001, 1 pg.
OCP DTR-156-SM-L1-CS, Single Mode Transceivers (1×9 pinout), Aug. 15, 2000, 4 pgs.
OCP DTR-156-SM-LS-A-L0-LR1-N-MSE-ALS, 2×5 Small Form Factor OC-3 Laser Transceivers, May 29, 2002, 7 pgs.
OCP DTR-156-SM-LS-A-L0-LR2-MSE-ALS, 2×5 Small Form Factor OC-3 Laser Transceivers, May 29, 2002, 7 pgs.
OCP DTR-156-SM-LS-A-L3-IR-MSE-ALS, 2×5 Small Form Factor OC-3 Laser Transceivers, May 15, 2002, 7 pgs.

(56) References Cited

OTHER PUBLICATIONS

OCP DTR-2488-3.3-SM, 3.3 volt OC-48/STM-16 1×9 Single Mode Transceiver, May 15, 2000, 5 pgs.
OCP DTR-2488-SM, 5 volt OC-48/STM-16 1×9 Single Mode Transceiver, May 15, 2000, 5 pgs.
OCP DTR-2488-SM2, OC-48/STM-16 Single Mode Transceiver, May 4, 1999, 5 pgs.
OCP DTR-2488-SM2-LC & DTR-2488-SM2-LS (ALC), 3.3 volt 2×10 LC connector OC-48 Single Mode Transceiver, Apr. 13, 2001, 5 pgs.
OCP DTR-2488-SM2-LC & DTR-2488-SM2-LS, 3.3 volt 2×10 LC connector OC-48 Single Mode Transceiver, Mar. 23, 2001, 5 pgs.
OCP DTR-2488-SM-LC & DTR-2488-SM-LS, 3.3 volt 2×5 LC connector OC-48 Single Mode Transceiver, Feb. 2, 2001, 5 pgs.
OCP DTR-2488-SM-LC-L1-SR-M-CM, 2×5 Short Reach OC-48 LC Single Mode Transceiver with CML DATA interface, Jul. 15, 2000, 3 pgs.
OCP DTR-622-3.3-CS, OC-12 Multimode Transceiver, Dec. 9, 2000, 1 pg.
OCP DTR-622-3.3-SM-L3-IR-CS, 3.3 Volt OC-12/STM-4 Single Mode Transceivers (1×9 pin-out), Dec. 7, 2001, 1 pg.
OCP DTR-622-SD & DTR-622-A-SD, OC-12/STM-4 "SD" 1×9 Multimode Transceiver, Jun. 10, 1999, 3 pgs.
OCP DTR-622-SM "SD" OC-12/STM-4 "SD" 1×9 Single Mode Transceiver, Nov. 8, 1999 , 4 pgs.
OCP DTR-622-SM "SE", OC-12/STM-4 "SE" 1×9 Single Mode Transceiver, Dec. 11, 2000, 4 pgs.
OCP DTR-622-SM2-LC-PM & DTR-622-SM2-LS-PM, 3.3 Volt 2×10 LC connector OC-12 Single Mode Transceivers with Receiver Power Monitor, Nov. 9, 2000, 6 pgs.
OCP DTR-622-SM-A-HP-LR2-SL, OC-12/STM-4 "SL" Single Mode Transceivers (1×9 pin-out), Jan. 11, 2001, 4 pgs.
OCP DTR-xxx-3.3 (3.3 Volt Multimode Transceivers) for ATM/SONET/SDH, Fibre Channel FDDI & Fast Ethernet, Sep. 28, 1999, 9 pgs.
OCP DTR-xxx-3.3-SM, 3.3 Volt Single Mode Transceivers (1×9 pin-out), Mar. 1, 1999, 9 pgs.
OCP DTR-xxx-3.3-SM2, 3.3 Volt OC-1 to OC-12 Single Mode Transceivers (2×9 pin-out), Mar. 30, 1999, 8 pgs.
OCP DTR-xxx-3.3-SM-T, 3.3 Volt Single Mode Transceivers (1×9 pin-out), May 10, 2002, 6 pgs.
COCP DTR-xxx-SM, Single Mode Transceivers (1×9 pin-out), Mar. 1, 1999, 9 pgs.
OCP DTR-xxx-SM2 Single Mode Transceivers (2×9 pin-out), Mar. 10, 1999, 9 pgs.
OCP DTR-xxx-SM2-CWDM, CWDM Single Mode Transceivers (2×9 pin-out) Jan. 18, 2002, 6 pgs.
OCP DTR-xxx-SM2-LC & DTR-xxx-SM2-LS, 3.3 Volt 2×10 LC connector OC-3 & OC-12 Single Mode Transceivers, Jul. 4, 2001, 7 pgs.
OCP DTR-xxx-SM-CWDM CWDM Single Mode Transceivers (1×9 pin-out), Jan. 29, 2002, 6 pgs.
OCP DTR-xxx-SM-LC & DTR-xxx-SM-LS, 3.3 Volt 2×5 LC connector OC-3 & OC-12 Single Mode Transceivers, Sep. 4, 2000, 7 pgs.
OCP DWTX-48, OC-48/STM-16 ITU-grid DWDM Transmitters, Oct. 23, 2001, 5 pgs.
OCP Interface Circuits for DTC (2×9 Transceivers with Clock), Oct. 16, 1998, 2 pgs.
OCP Interface Circuits for DTR-SM2 (2×9 Transceivers), Jan. 16, 1998, 2 pgs.
OCP PTC-48, 2.5 Gbits/s Transponder with 16-Channel 155Mbits/s Multiplexer/Demultiplexer with Clock Recovery, Sep. 5, 2001, 11 pgs.
OCP PTC-48SL, Compact size & Low Current consumption, 2.5 Gbits/s Transponder with 16-Channel 155Mbits/s Multiplexer/ Demultiplexer with Clock Recovery, Sep. 5, 2001, 11 pgs.
OCP PTC-48SP, Compact size & Low Current consumption, 2.5 Gbits/s Transponder with 16-Channel 155Mbits/s Multiplexer/ Demultiplexer with Clock Recovery, May 9, 2002, 11 pgs.

OCP SRC-03, OC-3/STM-1 Receiver with Clock Recovery, Feb. 8, 1999, 5 pgs.
OCP SRC-03-S, OC-3/STM-1 Receiver with Clock Recovery in 24-pin package, Jul. 7, 1997, 5 pgs.
OCP SRC-12, OC-12/STM-4 Receiver with Clock Recovery, May 3, 1999, 5 pgs.
OCP SRC-12-APD, High Sensitivity OC-12/STM-4 APD Receiver with Clock Recovery, Feb. 7, 2001, 3 pgs.
OCP SRC-12-APD-PSC-A-ALC, High Sensitivity OC-12/STM-4 APD Receiver with Clock Recovery, Mar. 26, 2001, 3 pgs.
OCP SRC-12-H, OC-12/STM-4 Receiver with Clock Recovery, Sep. 29, 1999, 5 pgs.
OCP SRC-12-S, OC-12/STM-4 Receiver with Clock Recovery in 24-pin package, Dec. 7, 1998, 5 pgs.
OCP SRC-48, OC48/STM-16 Receiver with Clock Recovery, Sep. 16, 2002, 5 pgs.
OCP SRX-03-APD, High Sensitivity OC-3/STM-1 APD Receiver, Apr. 28, 2002, 4 pgs.
OCP SRX-12-APD, High Sensitivity OC-12/STM-4 APD Receiver, Mar. 16, 1998, 4 pgs.
OCP SRX-12-L, OC-12/STM-4 Receiver (TTL Signal Detect), May 3, 1999, 5 pgs.
OCP SRX-48 ALC, OC-48/STM-16 Receiver without Clock Recovery, Mar. 8, 2001, 3 pgs.
OCP SRX-48, OC-48/STM-16 Receiver without Clock Recovery, Sep. 16, 2002, 5 pgs.
OCP SRX-48-PSC-B-LR-ALC, OC-48/STM-16 Receiver without Clock Recovery, Oct. 19, 2001, 1 pg.
OCP STX/SRX SONET/SDH Transmitters & Receivers, Feb. 7, 2002, 9 pgs.
OCP STX-01-PLC-B-L1-C510-ALC, SONET OC-1 CWDM 1510nm Transmitter, Feb. 7, 2002, 1 pg.
OCP STX-03/SRX-03, OC-3 SONET/SDH Transmitters & Receivers, Sep. 28, 1999, 5 pgs.
OCP STX-03-xxx-L3-IR-D5, OC-3 SONET/SDH Transmitters, May 7, 1999, 3 pgs.
OCP STX-12-PSC-A-L3-IR-ALC, SONET/SDH Transmitter, Aug. 15, 2000, 3 pgs.
OCP STX-200-LED-SW-100, Short Wavelength Transmitter, Dec. 10, 1997, 2 pgs.
OCP STX-48 ALC, OC-48/STM-16 Transmitter, Mar. 6, 2001, 5 pgs.
OCP STX-48, OC-48/STM-16 Transmitter, Sep. 16, 2002, 5 pgs.
OCP STX-48-MS, OC-48/STM-16 Transmitter, Jul. 23, 2001, 4 pgs.
OCP STX-xx-3.3 / SRX-xx-3.3, 3.3 Volt SONET/SDH Transmitters & Receivers, Mar. 8, 1999, 9 pgs.
OCP TRP-48 Single Mode, OC-48/STM-16 LC Small Form-factor Pluggable (SFP) Single Mode Transceivers, Jul. 25, 2002, 5 pgs.
OCP TRP-F2 Single Mode, 3.3V Double Speed Single Mode Fibre Channel LC connector Small Form-factor Pluggable (SFP) Transceivers, Jul. 3, 2002, 5 pgs.
OCP TRP-FE (Multimode), Fast Ethernet (100-FX) LC Small Form-factor Pluggable (SFP) Multimode Transceivers, Jun. 28, 2002, 5 pgs.
OCP TRP-G1 Multi-Mode, 3.3V Gigabit Ethernet 850 nm VCSEL Small Form-factor Pluggable (SFP) Transceivers, Jun. 27, 2002, 5 pgs.
OCP, Optical Communication Products, Inc., Optical Communication Products Announces the Appointment of John Lemasters as its New Chaiinian, May 9, 2002, 1 pg.
PCO FDDI Transceiver, "FTR-1300-S1N and FTR-1300-S1C FDDI Data-Only Transceivers Preliminary Sheets" Oct. 1993, 8 pgs.
PCO FDDI Transceiver, FTR-1300-S1 FDDI Data-Only Transceiver, Oct. 1993, 8 pgs.
Petition to Make Special Under 37 C.F.R. §1.102, U.S. Appl. No. 09/777,917, dated Dec. 11, 2002, 12 pgs.
Petition to Make Special Under 37 C.F.R. §1.102, U.S. Appl. No. 10/266,869, dated Oct. 27, 2003, 9 pgs.
Philips Semiconductors, NE1619 HECETA4 Temperature and Voltage Monitor, Aug. 29, 2001, 18 pgs.
Phillip Semiconductors, NE1619 HECETA4 Temperature and Voltage Monitor, Jul. 13, 2000, 18 pgs.

(56) References Cited

OTHER PUBLICATIONS

Philips Semiconductors, NE1617 Temperature Monitor for Microprocessor System, Mar. 19, 1999, 16 pgs.
Piven, 3COM's Got Wireless in the Palm of Its Hand-So Far, Technology Review, May 1999, 3 pgs.
Public-Key Encryption, www.webopedia.com/term/p/public_key_cryptography.html, Oct. 9, 2003, 1 pg.
Purdy Electronics Corporation, OPTO-3001A Transceiver OPTO-3001 Transceiver, Digital Digital Data Links (660 & 800 nm), Interoptics, Jun. 5, 2000, 1 pg.
Response to Final Office Action, U.S. Appl. No. 10/657,554, dated Sep. 16, 2005, 12 pgs.
Response to Office Action, U.S. Appl. No. 10/266,869, dated Jan. 31, 2005, 22 pgs.
Response to Office Action, U.S. Appl. No. 10/657,554, dated Mar. 13, 2006, 15 pgs.
Response to Office Action, U.S. Appl. No. 10/657,554, dated Jan. 31, 2005, 9 pgs.
Response to Office Action, U.S. Appl. No. 10/713,685, dated Nov. 23, 2004, 17 pgs.
Response to Office Action, U.S. Appl. No. 10/713,752, dated Nov. 19, 2004, 10 pgs.
Response to Office Action, U.S. Appl. No. 10/766,488, dated Feb. 27, 2007, 51 pgs.
Response to Office Action, U.S. Appl. No. 11/077,280, dated May 22, 2006, 8 pgs.
Aronson, Response to Office Action, U.S. Appl. No. 14/936,642, dated Jul. 20, 2016, 16 pgs.
Second Preliminary Amendment, U.S. Appl. No. 10/266,869, dated Oct. 27, 2003, 12 pgs.
SFF Committee, SFF-8053 Specification for GBIC (Gigabit Interface Converter), Rev 5.5, Sep. 27, 2000, pp. i-xviii and 1-66.
SODERSTROM, CD Laser Optical Data Links for Workstations and Midrange Computers, IEEE Xplore, 1993, pp. 505-509.
Telcordia, Synchronous Optical Network (SONET) Transport Systems: Common Generic Criteria, 697 pgs, Issue 4, Dec. 2005, OPLINK 6610.
Texas Instruments, TLK1501 Serdes EVM Kit Setup and Usage, User's Guide, SLLU008, Jun. 2000, 53 pgs.
Texas Instruments, TLK2201 Serdes EVM Kit Setup and Usage, User's Guide, SLLU011, Jun. 2000, 26 pgs.
The 7 Layers of the OSI Model, webopedia.internet.com/quick_ref/OSI-Layers.asp, Aug. 8, 2002, 3 pgs.
THMC10 Remote/Local Temperature Monitor with SMBus Interface, Texas Instruments, Dec. 1999, 22 pgs.
Toshiba, Fiber Optic Transceiver Module TODX280, Fiber Optic Transceiving Module for Duplex Digital Signal Communication, Oct. 1993, 9 pgs.
Toshiba, Fiber Optic Transceiver Module TODX294, Fiber Optic Transceiving Module for Duplex Digital Signal Communication, Oct. 1993, 9 pgs.
TRV5366 OC-1 Transceiver, Oct. 1993, 2 pgs.
TRV5466 OC-3 Transceiver, Oct. 1993, 2 pgs.
UDA, Fiber Optic Transciever for FDDI Application, FOC/LAN 1988, pp. 160-164.
Underwriters Laboratories, Optical Communications Products, ISO 9001:1994, Jan. 23, 2002, 1 pg.
Vaishali Semiconductor, Fibre Channel Transceiver VN16117, preliminary Product Information, MDSN-0002-02, Aug. 9, 2001, 15 pgs.
Wright, 21st Century Manufacturing, First Edition, 2001, p. 234.
www.networknews.co.uk, Shomiti has built itself . . . , 2 pgs, Aug. 29, 2001, OPLINK 10725.
XICOR, Hot Pluggable X9520, Fiber Channel / Gigabit Ethernet Laser Diode Control for Fiber Optic Modules, 2000, 33 pgs.
XICOR, Hot Pluggable X9520, Fiber Channel / Gigabit Ethernet Laser Diode Control for Fiber Optic Modules, Oct. 4, 2002, 34 pgs.
YAMASHITA, Compact-Same-Size 52-and 156Mb/s SDH Optical Transceiver Modules, Journal of Lightwave Technology, vol. 12, No. 9, Sep. 1994, pp. 1607-1615.

* cited by examiner

METHOD OF MONITORING AN OPTOELECTRONIC TRANSCEIVER WITH MULTIPLE FLAG VALUES FOR A RESPECTIVE OPERATING CONDITION

RELATED APPLICATIONS

This application is a continuation of U.S. application Ser. No. 14/936,642, filed Nov. 9, 2015, which is a continuation of U.S. application Ser. No. 14/494,823, filed Sep. 24, 2014, now U.S. Pat. No. 9,184,850, which is a continuation of U.S. application Ser. No. 13/948,082, filed Jul. 22, 2013, now U.S. Pat. No. 8,849,123, which is a continuation of U.S. application Ser. No. 13/336,963, filed Dec. 23, 2011, now U.S. Pat. No. 8,515,284, which is a continuation of U.S. application Ser. No. 12/400,752, filed Mar. 9, 2009, now U.S. Pat. No. 8,086,100, which is a continuation of U.S. application Ser. No. 11/679,800, filed Feb. 27, 2007, now U.S. Pat. No. 7,502,564, which is a continuation of U.S. application Ser. No. 10/657,554, filed Sep. 4, 2003, now U.S. Pat. No. 7,184,668, which is a continuation of U.S. application Ser. No. 10/266,869, filed Oct. 8, 2002, now U.S. Pat. No. 7,058,310, which is a continuation-in-part of prior application Ser. No. 09/777,917, filed Feb. 5, 2001, now U.S. Pat. No. 7,079,775, all of which are hereby incorporated by reference in their entireties.

FIELD OF THE INVENTION

The present invention relates generally to the field of fiber optic transceivers and particularly to circuits used to monitor and control these transceivers. More specifically, the present invention is used to identify abnormal and potentially unsafe operating parameters and to report these to a host coupled to the fiber optic transceiver and/or perform laser shutdown, as appropriate.

BACKGROUND OF THE INVENTION

The two most basic electronic circuits within a fiber optic transceiver are the laser driver circuit, which accepts high speed digital data and electrically drives an LED or laser diode to create equivalent optical pulses, and the receiver circuit which takes relatively small signals from an optical detector and amplifies and limits them to create a uniform amplitude digital electronic output. In addition to, and sometimes in conjunction with these basic functions, there are a number of other tasks that must be handled by the transceiver circuitry as well as a number of tasks that may optionally be handled by the transceiver circuit to improve its functionality. These tasks include, but are not necessarily limited to, the following:

Setup functions. These generally relate to the required adjustments made on a part-to-part basis in the factory to allow for variations in component characteristics such as laser diode threshold current.

Identification. This refers to general purpose memory, typically EEPROM (electrically erasable and programmable read only memory) or other nonvolatile memory. The memory is preferably accessible using a serial communication bus in accordance with an industry standard. The memory is used to store various information identifying the transceiver type, capability, serial number, and compatibility with various standards. While not standard, it would be desirable to further store in this memory additional information, such as sub-component revisions and factory test data.

Eye safety and general fault detection. These functions are used to identify abnormal and potentially unsafe operating parameters and to report these to the user and/or perform laser shutdown, as appropriate.

In addition, it would be desirable in many transceivers for the control circuitry to perform some or all of the following additional functions:

Temperature compensation functions. For example, compensating for known temperature variations in key laser characteristics such as slope efficiency.

Monitoring functions. Monitoring various parameters related to the transceiver operating characteristics and environment. Examples of parameters that it would be desirable to monitor include laser bias current, laser output power, received power level, supply voltage and temperature. Ideally, these parameters should be monitored and reported to, or made available to, a host device and thus to the user of the transceiver.

Power on time. It would be desirable for the transceiver's control circuitry to keep track of the total number of hours the transceiver has been in the power on state, and to report or make this time value available to a host device.

Margining. "Margining" is a mechanism that allows the end user to test the transceiver's performance at a known deviation from ideal operating conditions, generally by scaling the control signals used to drive the transceiver's active components.

Other digital signals. It would be desirable to enable a host device to be able to configure the transceiver so as to make it compatible with various requirements for the polarity and output types of digital inputs and outputs. For instance, digital inputs are used for transmitter disable and rate selection functions while digital outputs are used to indicate transmitter fault and loss of signal conditions.

Few if any of these additional functions are implemented in most transceivers, in part because of the cost of doing so. Some of these functions have been implemented using discrete circuitry, for example using a general purpose EEPROM for identification purposes, by inclusion of some functions within the laser driver or receiver circuitry (for example some degree of temperature compensation in a laser driver circuit) or with the use of a commercial microcontroller integrated circuit. However, to date there have not been any transceivers that provide a uniform device architecture that will support all of these functions, as well as additional functions not listed here, in a cost effective manner.

It is the purpose of the present invention to provide a general and flexible integrated circuit that accomplishes all (or any subset) of the above functionality using a straightforward memory mapped architecture and a simple serial communication mechanism.

FIG. 1 shows a schematic representation of the essential features of a typical prior-art fiber optic transceiver. The main circuit 1 contains at a minimum transmit and receiver circuit paths and power supply voltage 19 and ground connections 18. The receiver circuit typically consists of a Receiver Optical Subassembly (ROSA) 2 which contains a mechanical fiber receptacle as well as a photodiode and pre-amplifier (preamp) circuit. The ROSA is in turn connected to a post-amplifier (postamp) integrated circuit 4, the function of which is to generate a fixed output swing digital signal which is connected to outside circuitry via the RX+ and RX− pins 17. The postamp circuit also often provides a digital output signal known as Signal Detect or Loss of Signal indicating the presence or absence of suitably strong optical input. The Signal Detect output is provided as an output on pin 18. The transmit circuit will typically consist of a Transmitter Optical Subassembly (TOSA), 3 and a laser driver integrated circuit 5. The TOSA contains a mechanical fiber receptacle as well as a laser diode or LED. The laser driver circuit will typically provide AC drive and DC bias current to the laser. The signal inputs for the AC driver are obtained from the TX+ and TX− pins 12. Typically, the laser driver circuitry will require individual factory setup of certain parameters such as the bias current (or output power) level and AC modulation drive to the laser. Typically this is accomplished by adjusting variable resistors or placing factory selected resistors 7, 9 (i.e., having factory selected resistance values). Additionally, temperature compensation of the bias current and modulation is often required. This function can be integrated in the laser driver integrated circuit or accomplished through the use of external temperature sensitive elements such as thermistors 6, 8.

In addition to the most basic functions described above, some transceiver platform standards involve additional functionality. Examples of this are the external TX disable 13 and TX fault 14 pins described in the GBIC standard. In the GBIC standard, the external TX disable pin allows the transmitter to be shut off by the host device, while the TX fault pin is an indicator to the host device of some fault condition existing in the laser or associated laser driver circuit. In addition to this basic description, the GBIC standard includes a series of timing diagrams describing how these controls function and interact with each other to implement reset operations and other actions. Some of this functionality is aimed at preventing non-eyesafe emission levels when a fault conditions exists in the laser circuit. These functions may be integrated into the laser driver circuit itself or in an optional additional integrated circuit 11. Finally, the GBIC standard also requires the EEPROM 10 to store standardized serial ID information that can be read out via a serial interface (defined as using the serial interface of the ATMEL AT24C01A family of EEPROM products) consisting of a clock 15 and data 16 line.

Similar principles clearly apply to fiber optic transmitters or receivers that only implement half of the full transceiver functions.

In addition, optical energy emitted from fiber optic transceivers is potentially dangerous to the human eye. Of particular concern are lasers, because they emit monochromatic, coherent, and highly collimated light that concentrates energy into a narrow beam. It is the energy density of this narrow beam that can harm biological tissues, particularly the eye.

The severity of harm to biological tissues depends on the amount of energy, the exposure time, and the wavelength of the light, where the eye is more sensitive to lower wavelengths. Furthermore, seeing that most light used in fiber-optic systems is infrared energy that cannot be seen, a victim might be exposed to such infrared energy without noticing it.

Therefore, to address eye-safety concerns, laser-based products are regulated by standards. In the United States, responsibility for these regulations resides in the Center for Devices and Radiological Health (CDRH) of the Food and Drug Administration. Outside of the United States, the principle regulation is International Electrotechnical Commission (IEC) Publication 825. These regulations cover both the devices themselves and products using them.

The CDRH and IEC regulations define four classes of devices as follows:

Class I: These devices are considered inherently safe. The IEC requires a classification label, but the CDRH does not.

Class II: Class 2 lasers have levels similar to a Class I device for an exposure of 0.25 second. Eye protection is normally provided by what is called a "normal aversion response." This means that a victim usually responds to an exposure by an involuntary blink of the eye.

Class III: Both the CDRH and IEC define two subclasses: IIIa and IIIb. Class IIIa devices cannot injure a person's eye under normal conditions of bright light. They can, however, injure eyes when viewed through an optical aid such as a microscope or telescope. For Class IIIa, the CDRH concerns only visible light, while the IEC includes all wavelengths. Class IIIb devices can injure the eye if the light is viewed directly.

Class IV: These devices are more powerful than even Class IIIb lasers. They can injure the eye even when viewed indirectly.

The abovementioned regulations use equations to determine acceptable power levels at a given wavelength as well as procedures for making measurements or estimating power levels. Most lasers in fiber optics are either Class I or Class IIIb devices. Class I devices require no special precautions. Class IIIb devices, besides cautionary labels and warnings in the documentation, require that circuits be designed to lessen the likelihood of accidental exposure. For example, a safety interlock is provided so that the laser will not operate if exposure is possible.

One safety system is called open fiber control (OFC), which shuts down the laser if the circuit between the transmitter and receiver is open. A typical OFC system continuously monitors an optical link to ensure that the link is operating correctly by having the receiving circuit provide feedback to the transmitting circuit. If the receiving circuit does not receive data, the transmitting circuit stops operating the laser, under the assumption that a fault has occurred that might allow exposure to dangerous optical levels. This system, however, requires additional sensors and/or circuitry between the transmitter and the receiver. This is both costly and ineffective where the transmitter has not yet been coupled to a receiver.

In light of the above it is highly desirable to provide a system and method for identifying abnormal and potentially unsafe operating parameters of the fiber optic transceiver, to report these to the user, and/or perform laser shutdown, as appropriate.

SUMMARY OF THE INVENTION

The present invention is preferably implemented as a single-chip integrated circuit, sometimes called a controller, for controlling a transceiver having a laser transmitter and a photodiode receiver. The controller includes memory for storing information related to the transceiver, and analog to digital conversion circuitry for receiving a plurality of analog signals from the laser transmitter and photodiode receiver, converting the received analog signals into digital values, and storing the digital values in predefined locations within the memory. Comparison logic compares one or more of these digital values with predetermined setpoints, generates flag values based on the comparisons, and stores the flag values in predefined locations within the memory. Control circuitry in the controller controls the operation of the laser transmitter in accordance with one or more values stored in the memory. In particular, the control circuitry shuts off the laser transmitter in response to comparisons of signals with predetermined setpoints that indicate potential eye safety hazards.

A serial interface is provided to enable a host device to read from and write to locations within the memory. A plurality of the control functions and a plurality of the monitoring functions of the controller are exercised by a host computer by accessing corresponding memory mapped locations within the controller.

In some embodiments the controller further includes a cumulative clock for generating a time value corresponding to cumulative operation time of the transceiver, wherein the generated time value is readable via the serial interface.

In some embodiments the controller further includes a power supply voltage sensor that measures a power supply voltage supplied to the transceiver. In these embodiments the analog to digital conversion circuitry is configured to convert the power level signal into a digital power level value and to store the digital power level value in a predefined power level location within the memory. Further, the comparison logic of the controller may optionally include logic for comparing the digital power supply voltage with a voltage level limit value, generating a flag value based on the comparison of the digital power supply voltage with the power level limit value, and storing a power level flag value in a predefined power level flag location within the memory.

In some embodiments the controller further includes a temperature sensor that generates a temperature signal corresponding to a temperature of the transceiver. In these embodiments the analog to digital conversion circuitry is configured to convert the temperature signal into a digital temperature value and to store the digital temperature value in a predefined temperature location within the memory. Further, the comparison logic of the controller may optionally include logic for comparing the digital temperature value with a temperature limit value, generating a flag value based on the comparison of the digital temperature signal with the temperature limit value, and storing a temperature flag value in a predefined temperature flag location within the memory.

In some embodiments the controller further includes "margining" circuitry for adjusting one or more control signals generated by the control circuitry in accordance with an adjustment value stored in the memory.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DETAILED DESCRIPTION OF PREFERRED EMBODIMENTS

Figure 1:
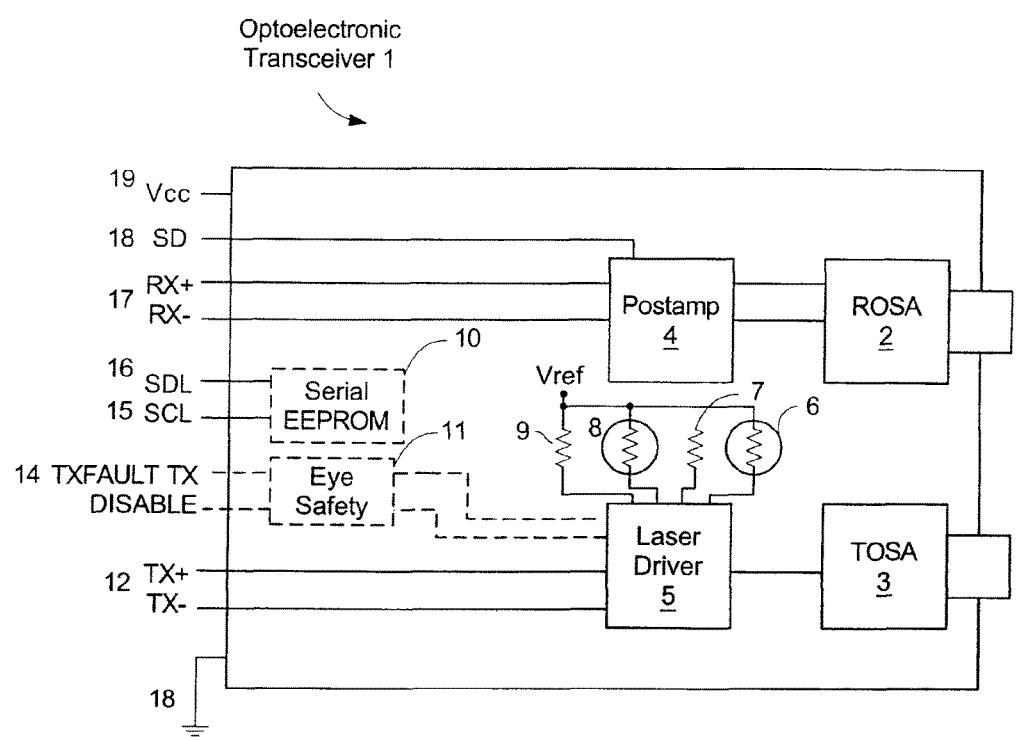
FIG. 1 is a block diagram of a prior art optoelectronic transceiver.
Figure 2:
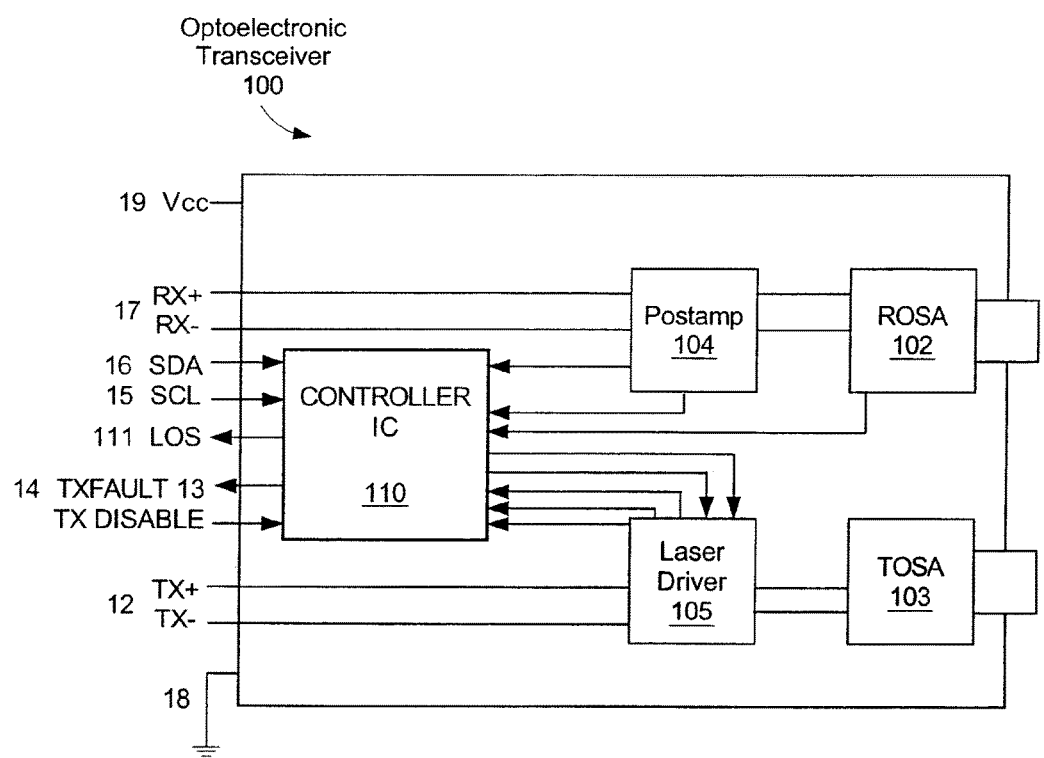
FIG. 2 is a block diagram of an optoelectronic transceiver in accordance with the present invention.
Figure 3:
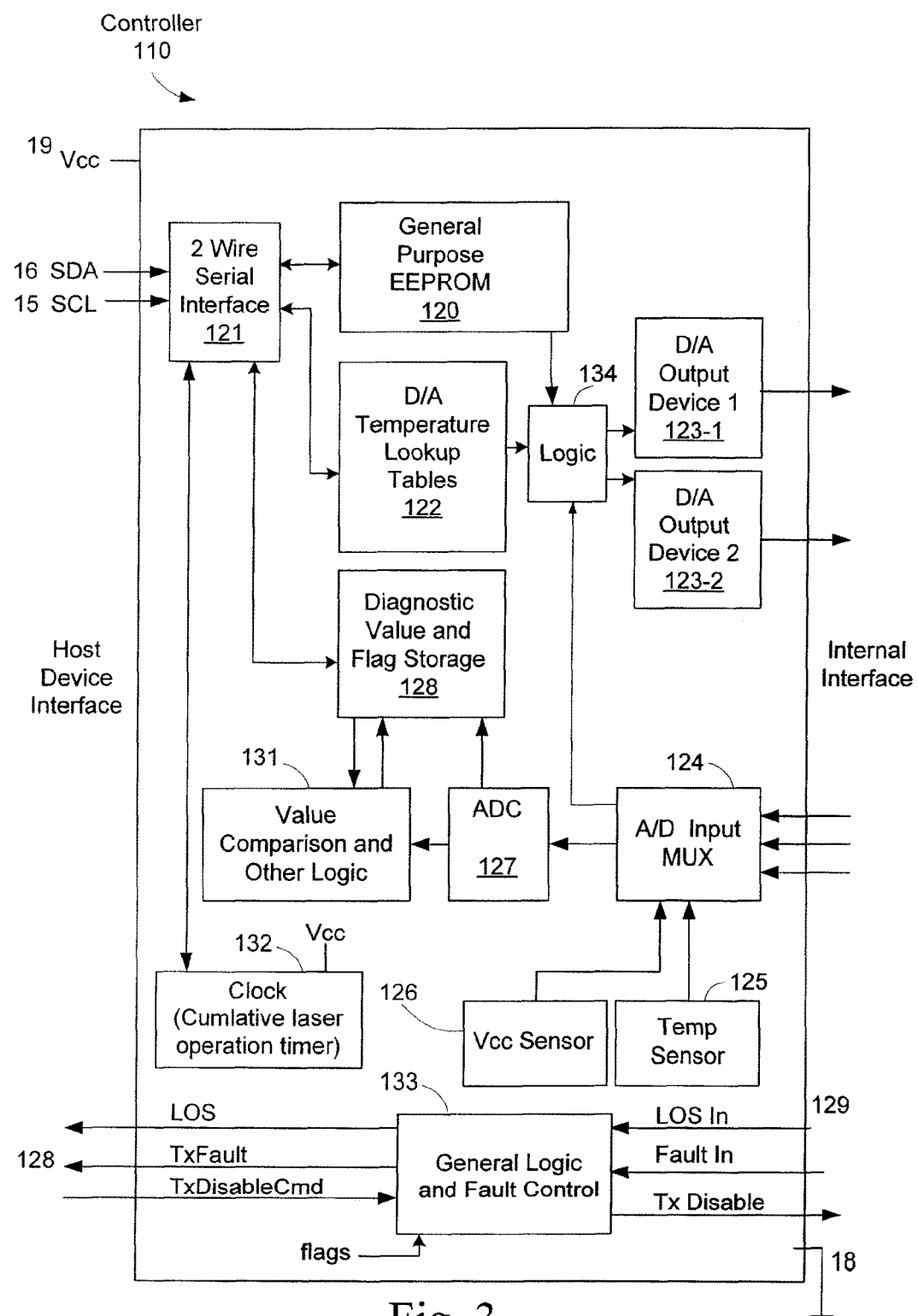
FIG. 3 is a block diagram of modules within the controller of the optoelectronic transceiver of FIG. 2.

A transceiver 100 based on the present invention is shown in FIGS. 2 and 3. The transceiver 100 contains a Receiver Optical Subassembly (ROSA) 102 and Transmitter Optical Subassembly (TOSA) 103 along with associated post-amplifier 104 and laser driver 105 integrated circuits that communicate the high speed electrical signals to the outside world. In this case, however, all other control and setup functions are implemented with a third single-chip integrated circuit 110 called the controller IC.

The controller IC 110 handles all low speed communications with the end user. These include the standardized pin functions such as Loss of Signal (LOS) 111, Transmitter Fault Indication (TX FAULT) 14, and the Transmitter Disable Input (TXDIS) 13. The controller IC 110 has a two wire serial interface 121, also called the memory interface, for accessing memory mapped locations in the controller. Memory Map Tables 1, 2, 3 and 4, below, are an exemplary memory map for one embodiment of a transceiver controller, as implemented in one embodiment of the present invention. It is noted that Memory Map Tables 1, 2, 3 and 4, in addition to showing a memory map of values and control features described in this document, also show a number of parameters and control mechanisms that are outside the scope of this document and thus are not part of the present invention.

The interface 121 is coupled to host device interface input/output lines, typically clock (SCL) and data (SDA) lines, 15 and 16. In the preferred embodiment, the serial interface 121 operates in accordance with the two wire serial interface standard that is also used in the GBIC and SFP standards, however other serial interfaces could equally well be used in alternate embodiments. The two wire serial interface 121 is used for all setup and querying of the controller IC 110, and enables access to the optoelectronic transceiver's control circuitry as a memory mapped device. That is, tables and parameters are set up by writing values to predefined memory locations of one or more nonvolatile memory devices 120, 122, 128 (e.g., EEPROM devices) in the controller, whereas diagnostic and other output and status values are output by reading predetermined memory locations of the same nonvolatile memory devices 120, 122, 128. This technique is consistent with currently defined serial ID functionality of many transceivers where a two wire serial interface is used to read out identification and capability data stored in EEPROM.

It is noted here that some of the memory locations in the memory devices 120, 122, 128 are dual ported, or even triple ported in some instances. That is, while these memory mapped locations can be read and in some cases written via the serial interface 121, they are also directly accessed by other circuitry in the controller 110. For instance, certain "margining" values stored in memory 120 are read and used directly by logic 134 to adjust (i.e., scale upwards or downwards) drive level signals being sent to the D/A output devices 123. Similarly, there are flags stored in memory 128 that are (A) written by logic circuit 131, and (B) read directly by logic circuit 133. An example of a memory mapped location not in memory devices but that is effectively dual ported is the output or result register of clock 132. In this case the accumulated time value in the register is readable via the serial interface 121, but is written by circuitry in the clock circuit 132.

In addition to the result register of the clock 132, other memory mapped locations in the controller may be implemented as registers at the input or output of respective sub-circuits of the controller. For instance, the margining values used to control the operation of logic 134 may be stored in registers in or near logic 134 instead of being stored within memory device 128. In another example, measurement values generated by the ADC 127 may be stored in registers. The memory interface 121 is configured to enable the memory interface to access each of these registers whenever the memory interface receives a command to access the data stored at the corresponding predefined memory mapped location. In such embodiments, "locations within the memory" include memory mapped registers throughout the controller.

In an alternate embodiment, the time value in the result register of the clock 132, or a value corresponding to that time value, is periodically stored in a memory location with the memory 128 (e.g., this may be done once per minute, or once per hour of device operation). In this alternate embodiment, the time value read by the host device via interface 121 is the last time value stored into the memory 128, as opposed to the current time value in the result register of the clock 132.

As shown in FIGS. 2 and 3, the controller IC 110 has connections to the laser driver 105 and receiver components. These connections serve multiple functions. The controller IC has a multiplicity of D/A converters 123. In the preferred embodiment the D/A converters are implemented as current sources, but in other embodiments the D/A converters may be implemented using voltage sources, and in yet other embodiments the D/A converters may be implemented using digital potentiometers. In the preferred embodiment, the output signals of the D/A converters are used to control key parameters of the laser driver circuit 105. In one embodiment, outputs of the D/A converters 123 are use to directly control the laser bias current as well as to control the level of AC modulation to the laser (constant bias operation). In another embodiment, the outputs of the D/A converters 123 of the controller 110 control the level of average output power of the laser driver 105 in addition to the AC modulation level (constant power operation).

In a preferred embodiment, the controller 110 includes mechanisms to compensate for temperature dependent characteristics of the laser. This is implemented in the controller 110 through the use of temperature lookup tables 122 that are used to assign values to the control outputs as a function of the temperature measured by a temperature sensor 125 within the controller IC 110. In alternate embodiments, the controller 110 may use D/A converters with voltage source outputs or may even replace one or more of the D/A converters 123 with digital potentiometers to control the characteristics of the laser driver 105. It should also be noted that while FIG. 2 refers to a system where the laser driver 105 is specifically designed to accept inputs from the controller 110, it is possible to use the controller IC 110 with many other laser driver ICs to control their output characteristics.

In addition to temperature dependent analog output controls, the controller IC may be equipped with a multiplicity of temperature independent (one memory set value) analog outputs. These temperature independent outputs serve numerous functions, but one particularly interesting application is as a fine adjustment to other settings of the laser driver 105 or postamp 104 in order to compensate for process induced variations in the characteristics of those devices. One example of this might be the output swing of the receiver postamp 104. Normally such a parameter would be fixed at design time to a desired value through the use of a set resistor. It often turns out, however, that normal process variations associated with the fabrication of the postamp integrated circuit 104 induce undesirable variations in the resulting output swing with a fixed set resistor. Using the present invention, an analog output of the controller IC 110, produced by an additional D/A converter 123, is used to adjust or compensate the output swing setting at manufacturing setup time on a part-by-part basis.

In addition to the connection from the controller to the laser driver 105, FIG. 2 shows a number of connections from the laser driver 105 to the controller IC 110, as well as similar connections from the ROSA 106 and Postamp 104 to the controller IC 110. These are analog monitoring connections that the controller IC 110 uses to provide diagnostic feedback to the host device via memory mapped locations in the controller IC. The controller IC 110 in the preferred embodiment has a multiplicity of analog inputs. The analog input signals indicate operating conditions of the transceiver and/or receiver circuitry. These analog signals are scanned by a multiplexer 124 and converted using an analog to digital converter (ADC) 127. The ADC 127 has 12 bit resolution in the preferred embodiment, although ADC's with other resolution levels may be used in other embodiments. The converted values are stored in predefined memory locations, for instance in the diagnostic value and flag storage device 128 shown in FIG. 3, and are accessible to the host device via memory reads. These values are calibrated to standard units (such as millivolts or microwatts) as part of a factory calibration procedure.

The digitized quantities stored in memory mapped locations within the controller IC include, but are not limited to, the laser bias current, transmitted laser power, and received power (as measured by the photodiode detector in the ROSA 102). In the memory map tables (e.g., Table 1), the measured laser bias current is denoted as parameter $B_{in}$, the measured transmitted laser power is denoted as $P_{in}$, and the measured received power is denoted as $R_{in}$. The memory map tables indicate the memory locations where, in an exemplary implementation, these measured values are stored, and also show where the corresponding limit values, flag values, and configuration values (e.g., for indicating the polarity of the flags) are stored.

As shown in FIG. 3, the controller 110 includes a voltage supply sensor 126. An analog voltage level signal generated by this sensor is converted to a digital voltage level signal by the ADC 127, and the digital voltage level signal is stored in memory 128. In a preferred embodiment, the A/D input multiplexer (mux) 124 and ADC 127 are controlled by a clock signal so as to automatically, periodically convert the monitored signals into digital signals, and to store those digital values in memory 128.

Furthermore, as the digital values are generated, the value comparison logic 131 of the controller compares these values to predefined limit values. The limit values are preferably stored in memory 128 at the factory, but the host device may overwrite the originally programmed limit values with new limit values. Each monitored signal is automatically compared with both a lower limit and upper limit value, resulting in the generation of two limit flag values that are then stored in the diagnostic value and flag storage device 128. For any monitored signals where there is no meaningful upper or lower limit, the corresponding limit value can be set to a value that will never cause the corresponding flag to be set.

The limit flags are also sometimes call alarm and warning flags. The host device (or end user) can monitor these flags to determine whether conditions exist that are likely to have caused a transceiver link to fail (alarm flags) or whether conditions exist which predict that a failure is likely to occur soon. Examples of such conditions might be a laser bias current which has fallen to zero, which is indicative of an immediate failure of the transmitter output, or a laser bias current in a constant power mode which exceeds its nominal value by more than 50%, which is an indication of a laser end-of-life condition. Thus, the automatically generated limit flags are useful because they provide a simple pass-fail decision on the transceiver functionality based on internally stored limit values.

In a preferred embodiment, fault control and logic circuit 133 logically OR's the alarm and warning flags, along with the internal LOS (loss of signal) input and Fault Input signals, to produce a binary Transceiver fault (TxFault) signal that is coupled to the host interface, and thus made available to the host device. The host device can be programmed to monitor the TxFault signal, and to respond to an assertion of the TxFault signal by automatically reading all the alarm and warning flags in the transceiver, as well as the corresponding monitored signals, so as to determine the cause of the alarm or warning.

The fault control and logic circuit 133 furthermore conveys a loss of signal (LOS) signal received from the receiver circuit (ROSA, FIG. 2) to the host interface.

Yet another function of the fault control and logic circuit 133 is to determine the polarity of its input and output signals in accordance with a set of configuration flags stored in memory 128. For instance, the Loss of Signal (LOS) output of circuit 133 may be either a logic low or logic high signal, as determined by a corresponding configuration flag stored in memory 128.

Other configuration flags (see Table 4) stored in memory 128 are used to determine the polarity of each of the warning and alarm flags. Yet other configuration values stored in memory 128 are used to determine the scaling applied by the ADC 127 when converting each of the monitored analog signals into digital values.

In an alternate embodiment, another input to the controller 102, at the host interface, is a rate selection signal. In FIG. 3 the rate selection signal is input to logic 133. This host generated signal would typically be a digital signal that specifies the expected data rate of data to be received by the receiver (ROSA 102). For instance, the rate selection signal might have two values, representing high and low data rates (e.g., 2.5 Gb/s and 1.25 Gb/s). The controller responds to the rate selection signal by generating control signals to set the analog receiver circuitry to a bandwidth corresponding to the value specified by the rate selection signal.

Another function of the fault control and logic circuit 133 is to disable the operation of the transmitter (TOSA, FIG. 2) when needed to ensure eye safety. There is a standards defined interaction between the state of the laser driver and an internal Tx Disable output, which is implemented by the fault control and logic circuit 133. When the logic circuit 133 detects a problem that might result in an eye safety hazard, the laser driver is preferably disabled by activating an internal Tx Disable signal output from the controller, as described in further detail below. The host device can reset this condition by sending a command signal on the external Tx Disable line 13 (FIG. 2) into the controller from the host. Further details of this functionality can be found below in relation to FIGS. 4-7.

Figure 4:
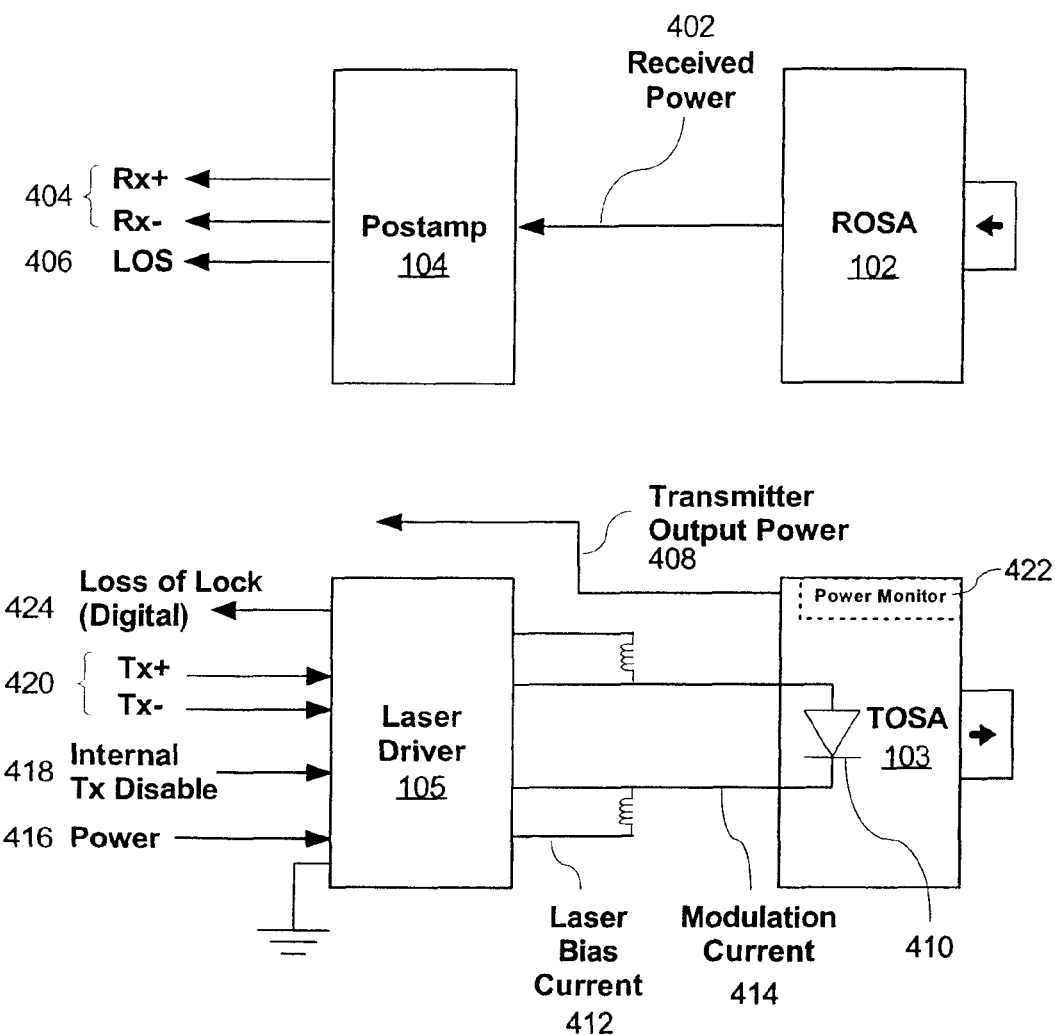
FIG. 4 is a more detailed block diagram of the connections between the controller and the laser driver and post-amplifier.

FIG. 4 is a more detailed block diagram of the connections between the controller 110 (FIG. 2) and the laser driver 105 and post-amplifier 104. Optical signals received by the optical receiver in the ROSA 102 are transmitted along a received power connection 402 to the postamp 104. The postamp 104 generates a fixed output swing digital signal which is connected to the host, and/or controller 110 (FIG. 2), via RX+ and RX− connections 404. The postamp circuit preferably also provides a Loss of Signal (LOS) indicator to the host, and/or controller 110 (FIG. 2), via a LOS connection 406, indicating the presence or absence of suitably strong optical input.

The host transmits signal inputs TX+ and TX− to the laser driver 105 via TX+ and TX− connections 420. In addition, the controller 110 (FIG. 2) transmits power to the laser driver via connection 416, and a transmitter disable signal to the laser driver 105 via an internal TX disable connection 418.

As a laser 410 within the TOSA is not turned on and off, but rather modulated between high and low levels above a threshold current, a modulation current is supplied to the laser 410 via an AC modulation current connection 414. Furthermore, a DC laser bias current is supplied from the laser driver 105 to the laser 410 via a laser bias current connection 412. The level of the laser bias current is adjusted to maintain proper laser output (i.e., to maintain a specified or predefined average level of optical output power by the TOSA 103) and to compensate for variations in temperature and power supply voltage.

In addition, some transceivers include an output power monitor 422 within the TOSA 103 that monitors the energy output from the laser 410. The output power monitor 422 is preferably a photodiode within the laser package that measures light emitted from the back facet of the laser 410. In general, the amount of optical power produced by the back facet of the laser diode, represented by an output power signal, is directly proportional to the optical power output by the front or main facet of the laser 410. The ratio, K, of the back facet optical power to the front facet optical power will vary from one laser diode to another, even among laser diodes of the same type. The output power signal is transmitted from the output power monitor 422 in the TOSA 103 to the controller 110 (FIG. 2) via a transmitter output power connection 408.

In a preferred embodiment, certain of the components within the fiber optic transceiver include monitoring logic that outputs digital fault conditions. For example, the laser driver 105 may output a "out of lock" signal 424 if a control loop monitoring the modulation current is broken. These digital fault condition outputs may then be used to notify the host of fault conditions within the component, or shut down the laser.

Figure 5A:
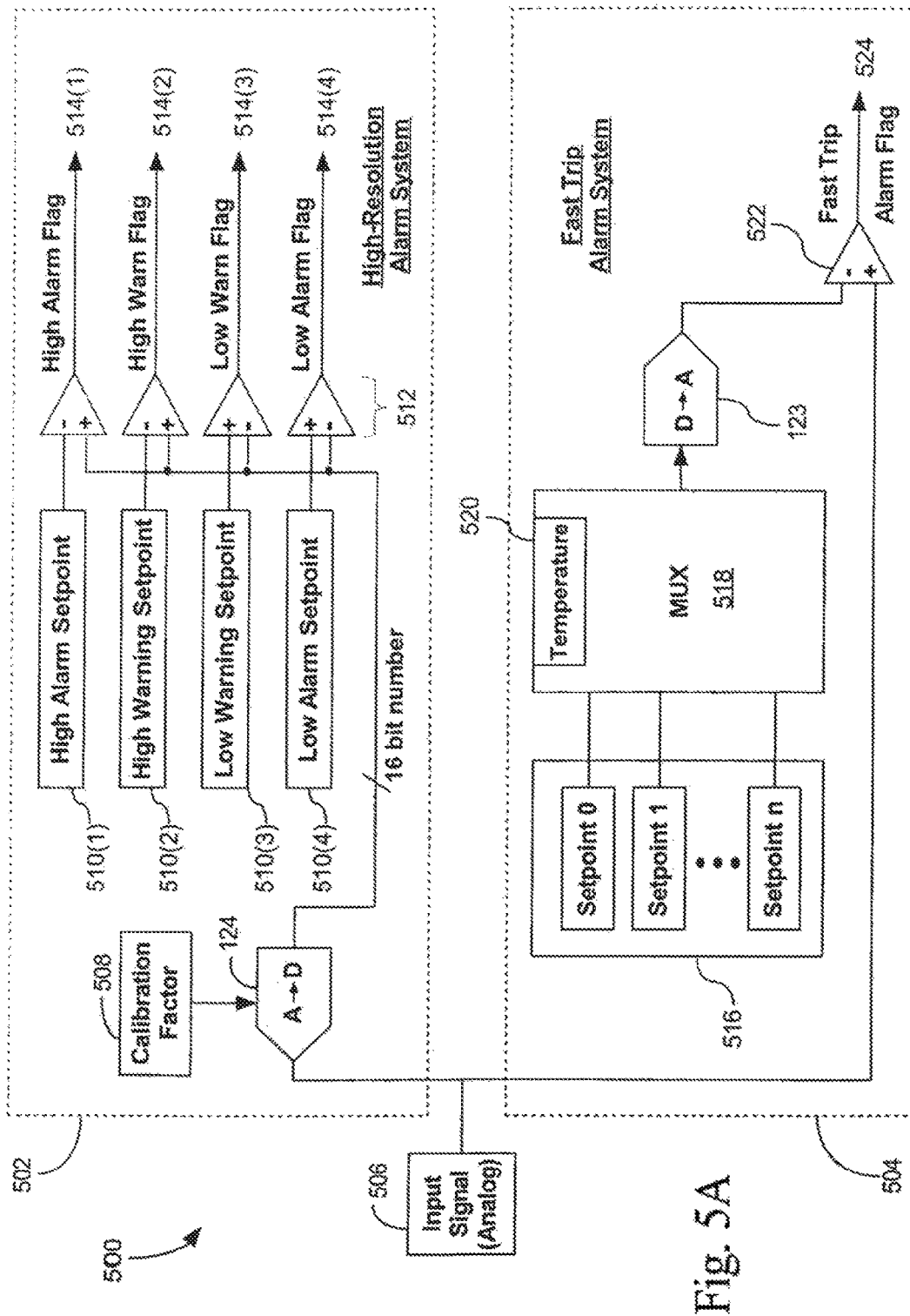
FIG. 5A is a block diagram of a high-resolution alarm system and a fast trip alarm system, for monitoring and controlling the operation of the fiber optic transceiver to ensure eye safety.

FIG. 5A is a block diagram 500 of a high-resolution alarm system 502 and a fast trip alarm system 504, for monitoring and controlling the operation of the fiber optic transceiver to ensure eye safety. The fast trip alarm system 504 is used to quickly generate flag used to shut down the laser 410 (FIG. 4). The fast trip alarm system 504 uses an analog comparator 522 to achieve a quick response. The high resolution alarm system 502 does not generate a flag to shut down the laser as quick as the fast trip alarm system 504. However, the high resolution alarm system 502 is more accurate than the fast trip alarm system 504. To achieve this accuracy, the high resolution alarm system 502 uses digital comparators 512. In use, the high resolution alarm system 502 and the fast trip alarm system 504 operate simultaneously. If the fast trip alarm system 504 does not generate a flag quickly, the high resolution alarm system 502 will identify the fault and generate a flag to shut down the laser.

The high-resolution alarm system 502 and fast trip alarm system 504 are preferably contained within the controller 110 (FIG. 3). Both the high-resolution alarm system 502 and fast trip alarm system 504 are coupled to an input signal 506. In a preferred embodiment this input signal is an analog signal. It should be noted that FIG. 5A shows the high-resolution alarm system 502 and fast trip alarm system 504 for a single input signal 506. However, in a preferred embodiment, identical alarm systems 502 and 504 are provided for each of several signals 506, including several different types of input signals.

The input signals processed by the alarm systems 502 and 504 preferably include: power supply voltage, internal transceiver temperature (hereinafter "temperature"), laser bias current, transmitter output power, and received optical power. The power supply voltage 19 (FIG. 3) is preferably the voltage in millivolts as measured by the Vcc sensor 126 (FIG. 3). The temperature is preferably the temperature in ° C. as measured by the temperature sensor 125 (FIG. 3). The laser bias current is preferably the laser bias current in microamps supplied to the laser 410 (FIG. 4) via the laser bias current connection 412 (FIG. 4). The received optical power is the power in microwatts received at the ROSA 102 (FIG. 4) via the received power connection 402 (FIG. 4). Finally, the optical output power (FIG. 4) is the optical power output in microwatts, from the power monitor 422 (FIG. 4) as received by the controller 110 (FIG. 2) via the output power connection 408 (FIG. 4).

The high-resolution alarm system 502 preferably utilizes all of the above described input signals to trigger warnings and/or shut down at least part of the fiber optic transceiver. In other embodiments the high-resolution alarm system 502 utilizes a subset of the above described input signals to trigger warnings and/or alarms. The high-resolution alarm system 502 includes one or more analog to digital converters 124 (see also FIG. 3) that are configured to receive the analog input signal 506. Each type of analog input signal is preferably converted to a digital input signal using a calibration factor 508 for the particular type of input signal received. For example, a supply voltage in millivolts is converted to a 16 bit digital number by multiplying a supply voltage millivolt value by a supply voltage calibration factor. These calibration factors are predetermined and are preferably stored in the diagnostic value and flag storage 128 (FIG. 3). Alternatively, such calibration factors 508 may be stored in the general purpose EEPROM 120 (FIG. 3).

The analog to digital converter 124 is also coupled to multiple comparators 512. In a preferred embodiment, the comparators 512 form a portion of the value comparison and other logic 131 (FIG. 3) in the controller 110 (FIG. 2). In a preferred embodiment, these comparators 512 are digital comparators.

Also coupled to the comparators 512 are high-resolution setpoints 510(1)-(N). In a preferred embodiment, four predetermined setpoints 510(1)-(4) (for each type of input signal 506) are stored in the diagnostic value and flag storage 128 (FIG. 3). These four predetermined setpoint values are: a high alarm setpoint 510(1), a high warning setpoint 510(2), a low warning setpoint 510(3), and a low alarm setpoint 510(4). The comparators 512(1)-(N) are configured to compare the input signal 506 with the predetermined setpoints 510(1)-(4). In a preferred embodiment, the digital equivalent of the input signal 506 is simultaneously compared by the comparators 512(1)-(N), to each of the four digital predetermined setpoints 510(1)-(N) for the particular type of input signal received. Also in a preferred embodiment, the setpoints 510(1)-(N) and the digital equivalents to the input signals 506 are preferably sixteen bit numbers. Of course, in other embodiments there may be more or fewer setpoints 510, and the setpoints 510 and input signal could be digitally represented by more or fewer than sixteen bits.

The comparators subsequently generate high-resolution flags 514(1)-(N), which are input into the general logic and fault control circuit 133 (FIG. 3) to either provide a warning to the host computer, or to shut down at least part of the fiber optic transceiver, such as the laser driver 105 (FIG. 4) and/or laser 410 (FIG. 4). Further details of the method for preventing potentially unsafe operation of the fiber optic transceiver, using the high-resolution alarm system 502, are described below in relation to FIG. 7.

The fast trip alarm system 504 includes multiple temperature dependant setpoints 516. These temperature dependant setpoints 516 are preferably stored in the diagnostic values flag storage 128 (FIG. 3) or the D/A temperature lookup tables 122 (FIG. 3). A multiplexer 518 is configured to supply one of the temperature dependant setpoints 516 to a digital to analog converter 123 (also shown in FIG. 3). The precise temperature dependant setpoint 516 that is supplied depends on the temperature 520 measured by the temperature sensor 125 (FIG. 3). For example, for a first measured temperature, a first setpoint is supplied by the multiplexer 518 to the digital to analog converter 123.

A separate copy or instance of the fast trip alarm system 504 is provided for each input signal 506 for which a temperature based alarm check is performed. Unlike the high-resolution alarm system 502, the fast trip alarm system 504 preferably utilizes only the following input signals 506: laser bias current, transmitter output power, and received optical power input signals, and thus in the preferred embodiment there are three instances of the fast trip alarm system 504. In other embodiment, fewer or more fast trip alarm systems 504 may be employed. The analog input signals processed by the fast trip alarm systems 504 are each fed to a respective comparator 522 that compares the input signal to an analog equivalent of one of the temperature dependant setpoints 516. In a preferred embodiment, the comparators 522 form a portion of the value comparison and other logic 131 (FIG. 3) in the controller 110 (FIG. 2). In a preferred embodiment, the comparators 522 are analog comparators.

In a preferred embodiment at least eight temperature dependant setpoints 516 are provided for the laser bias current input signal, with each setpoint corresponding to a distinct 16° C. temperature range. The size of the operating temperature range for each setpoint may be larger or smaller in other embodiments. These temperature dependant setpoints for the laser bias current are crucial because of the temperature compensation needs of a short wavelength module. In particular, at low temperatures the bias required to produce the required light output is much lower than at higher temperatures. In fact, a typical laser bias current when the fiber optic transceiver is at the high end of its temperature operating range will be two or three times as high as the laser bias current when fiber optic transceiver is at the low end of its temperature operating range, and thus the setpoints vary dramatically based on operating temperature. A typical temperature operating range of a fiber optic transceiver is about −40° C. to about 85° C. The temperature dependant setpoints for the laser bias current are also crucial because of the behavior of the laser bias circuit in a fiber optic transceiver that transmits long wavelength energy.

Also in a preferred embodiment, at least four temperature dependant setpoints 516 are provided for the received optical power and transceiver output power input signals, with each setpoint corresponding to a distinct 32° C. operating temperature range of the fiber optic transceiver. The size of the operating temperature range for each setpoint may be larger or smaller in other embodiments.

In a preferred embodiment, the above mentioned setpoints 516 are 8 bit numbers, which scale directly to the pin (Bin, Pin, Rin) input voltages at (2.5V(max)/256 counts)=0.0098 volts/count.

The comparator 522 is configured to compare an analog equivalent of one of the setpoints 516 to the analog input signal 506. In a preferred embodiment, if the analog input signal 506 is larger than the analog equivalent to one of the setpoints 516, then a fast trip alarm flag 524 is generated. The fast trip alarm flag 524 is input into the general logic and fault control circuit 133 (FIG. 3) to either provide a warning to the host computer or shut down at least part of the fiber optic transceiver, such as the laser driver 105 (FIG. 4) and/or laser 410 (FIG. 4). Further details of the method for preventing potentially unsafe operation of the fiber optic transceiver, using the fast trip alarm system 504, are described below in relation to FIG. 6.

Figure 5B:
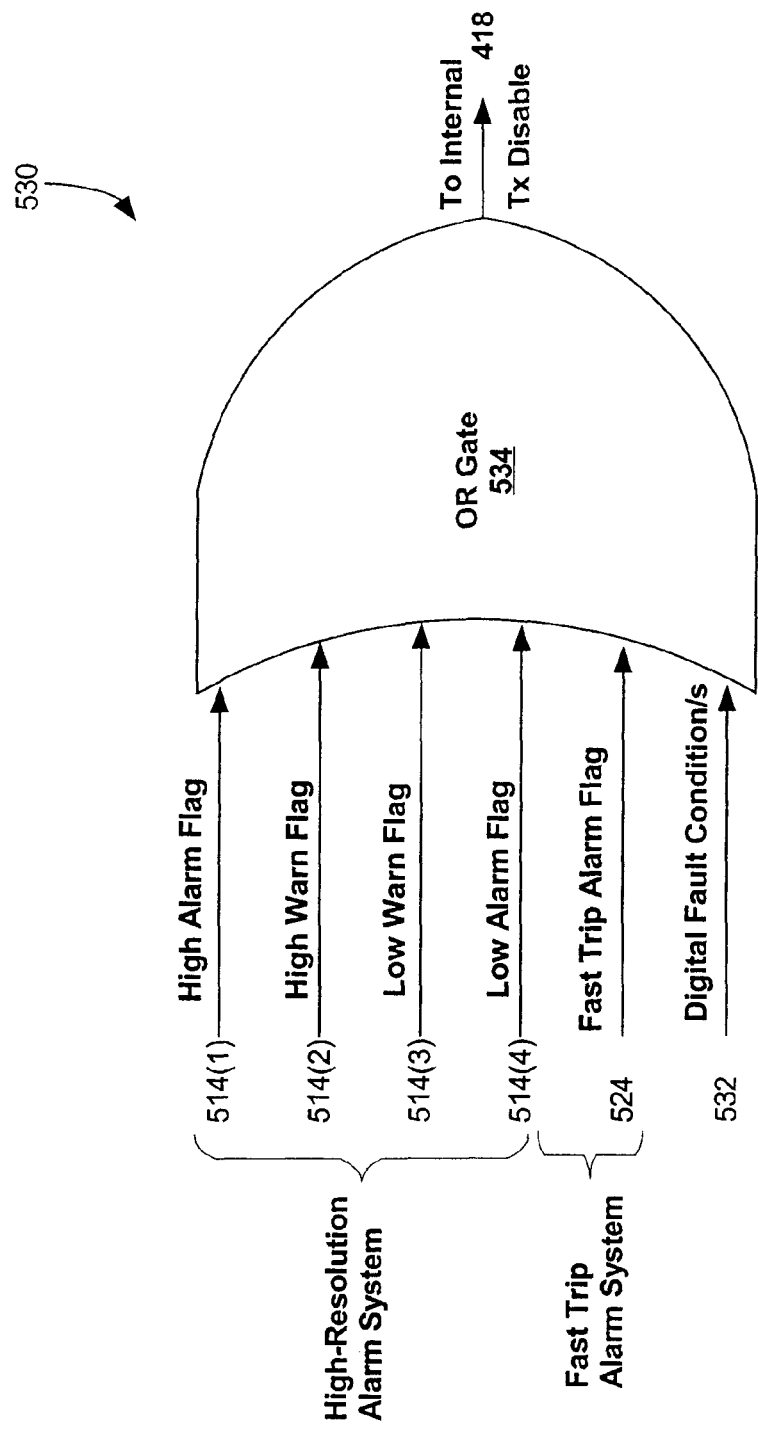
FIG. 5B is a block diagram of logic for disabling the operation of the fiber optic transceiver to ensure eye safety.

FIG. 5B is a block diagram of logic 530 for disabling the operation of the fiber optic transceiver to ensure eye safety, according to a preferred embodiment of the invention. The high-resolution alarm flags 514(1)-(4), the fast trip alarm system flag 524, and any digital fault condition 532 signals, from FIGS. 4 and 5A, are transmitted to an OR gate 534, which is used to shut down the laser. This is accomplished by sending a signal along the internal Tx disable line 418 (FIG. 4). For example if a digital "out of lock" signal or a fast trip alarm flag is received, the laser will be shut down. It should be appreciated that more or less alarm flags or digital fault condition signals may be supplied to the OR gate 534. For instance, in one preferred embodiment, the inputs to the OR gate 534 include only the high and low alarm flags 514(1), 514(4), the fast trip alarm flag 524 and the digital fault condition(s) signal 532. In other words, in this preferred embodiment, the warning flags 514(2) and 514(3) are not used to generate the internal Tx disable signal 418.

Figure 6:
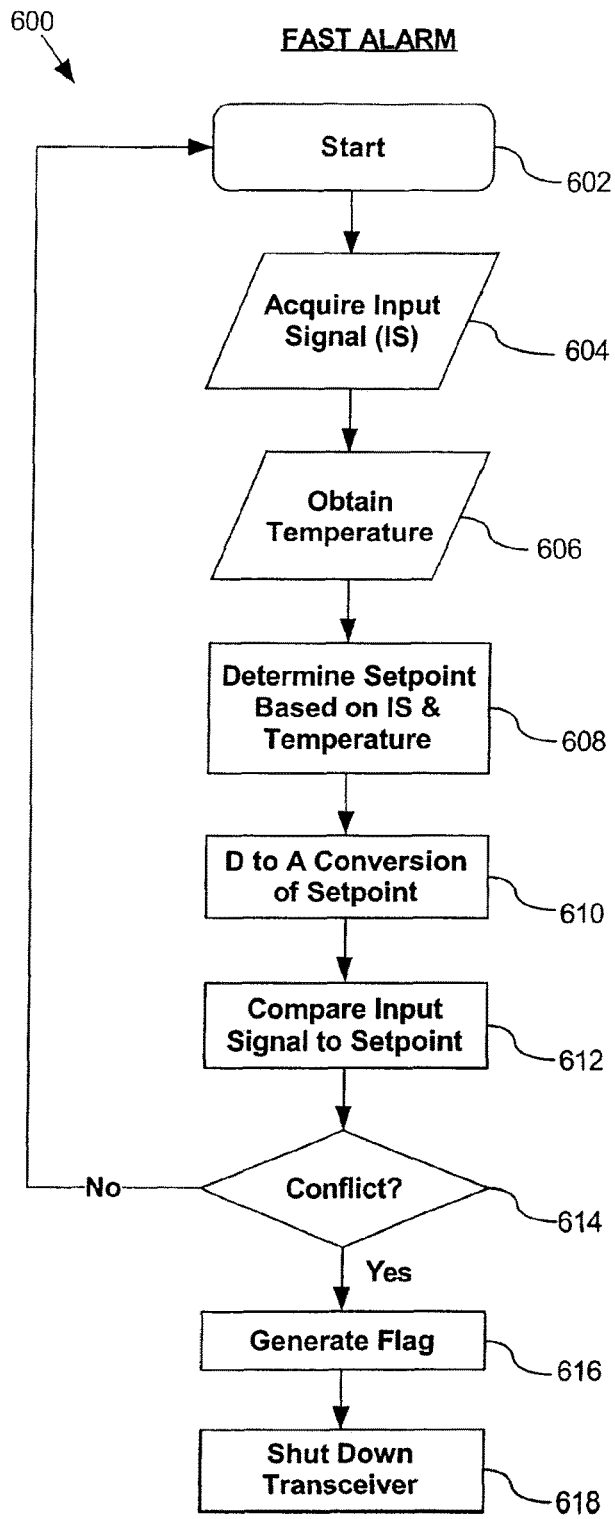
FIG. 6 is a flow chart of a method for reducing or preventing potentially unsafe operation of a fiber optic transceiver using the fast trip alarm system of FIG. 5A.

FIG. 6 is a flow chart of a method 600 for reducing or preventing potentially unsafe operation of a fiber optic transceiver using the fast trip alarm system 504 of FIG. 5A. Once the fast trip alarm system 504 (FIG. 5A) has started at step 602, an input signal is acquired, at step 604. In a preferred embodiment, the input signal is preferably an analog signal of: laser bias current in milliamps, received optical power in microwatts, or transceiver output power in microwatts. A temperature of the fiber optic transceiver is obtained at step 606. Step 606 may be performed before, after or at the same time as input signal acquisition step 604.

The multiplexer 518 (FIG. 5A) uses the input signal and the measured temperature to determine, at step 608, which setpoint 516 (FIG. 5A) to use for comparison with the input signal. For example, if the input signal is laser bias current, then the multiplexer looks up a setpoint for laser bias current based on the obtained temperature 520 (FIG. 5A).

In a preferred embodiment, this setpoint is then converted from a digital to analog value, at step 610 by the digital to analog converter 123 (FIG. 5A). Thereafter, the comparator 522 (FIG. 5A) compares the input signal to the setpoint, at step 612, to determine whether there is a conflict, at step 614. In a preferred embodiment, a conflict occurs where the input signal is higher than the setpoint (or an analog equivalent of the setpoint). Alternatively, a conflict may occur where the input signal is lower than the setpoint (or an analog equivalent of the setpoint).

If no conflict exists (614—No), then the method 600 repeats itself. However, if a conflict does exist (614—Yes), then a fast trip alarm flag 524 (FIG. 5A) is generated at step 616. In a preferred embodiment the fast trip alarm flag 524 (FIG. 5A) is then used to shut down at least part of the fiber optic transceiver, at step 618, by applying a signal to the internal TxDisable connection 418 (FIG. 4). In a preferred embodiment the fast trip alarm flag 524 (FIG. 5A) is used to disable the laser driver 105 (FIG. 4) and/or laser 410 (FIG. 4), so that no potential eye-damage can occur.

The alarm flag 524 (FIG. 5A) can be used to control the laser driver via the internal Tx Disable Output (Dout) and signal the fault to the host system via the Tx Fault Output (Fout). These outputs can also respond to the Tx Fault Input (Fin), if that signal exists in any given implementation, and the Tx Disable Input (Din) which comes into the fiber optic transceiver from the host.

Figure 7:
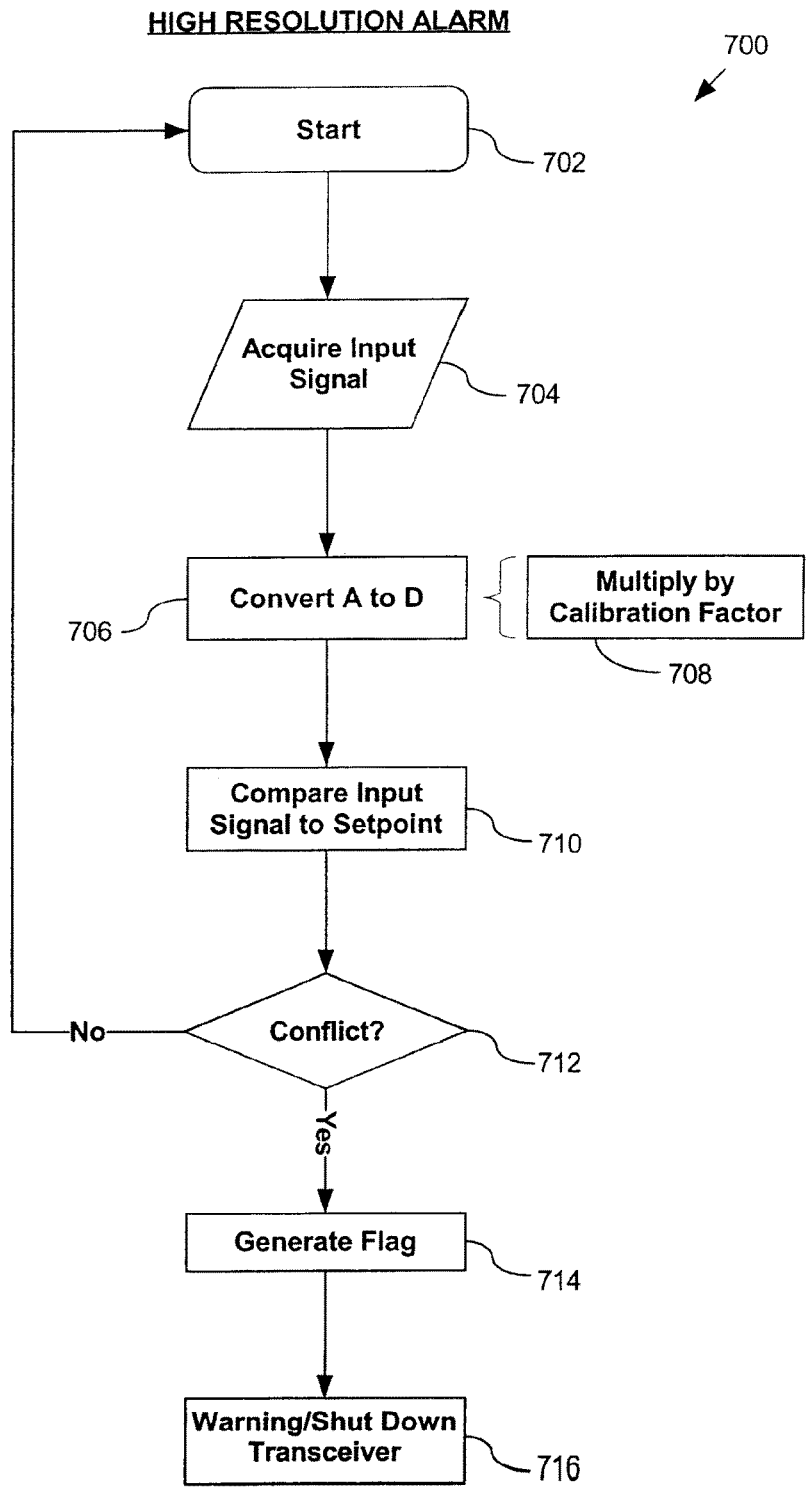
FIG. 7 is a flow chart of a method for reducing or preventing potentially unsafe operation of a fiber optic transceiver using the high-resolution alarm system of FIG. 5A.

FIG. 7 is a flow chart of a method 700 for reducing or preventing potentially unsafe operation of a fiber optic transceiver using the high-resolution alarm system 502 of FIG. 5A. Once the high-resolution alarm system 502 (FIG. 5A) has started at step 702, an input signal is acquired, at step 704. In a preferred embodiment, the input signal is preferably an analog signal of: power supply voltage 19 (FIG. 3) in millivolts; the temperature in ° C.; the laser bias current 412 (FIG. 4) in microamps; the received optical power 420 (FIG. 4) in microwatts; and the output power 408 (FIG. 4) in microwatts. In other embodiments, the input signal(s) may be scaled in accordance with other units.

An analog to digital converter 124 (FIGS. 3 and 5) then converts the analog input signal 506 (FIG. 5A) to a digital equivalent, preferably a 16 bit number, at step 706. Conversion of the analog input signal 506 (FIG. 5A) to a digital equivalent performed includes multiplying the input signal 506 (FIG. 5A) by a calibration factor 508 (FIG. 5A), at step 708, for the particular type of input signal received, as described above in relation to FIG. 5A.

The comparators 512 (FIG. 5A) then compare the digital equivalent of the input signal to the setpoints 510(1)-(N) (FIG. 5A), at step 710, to determine whether there is a conflict. In a preferred embodiment, conflicts occur when the digital equivalent of the input signal is: higher than the high alarm setpoint 510(1) to produce a high-alarm flag 514(1) (FIG. 5A); higher than the high warning setpoint 510(2) (FIG. 5A) to produce a high warning flag 514(2) (FIG. 5A); lower than a low warning flag 510(3) (FIG. 5A) to produce a low warning flag 514(3) (FIG. 5A); or lower than a low alarm flag 510(4) (FIG. 5A) to produce a low alarm flag 514(4) (FIG. 5A). It should, however, be appreciated that other types of alarms or warnings may be set.

If no conflict exists (712—No), then the method 700 repeats itself. However, if a conflict does exist (714—Yes), then a high-resolution flag 514(1)-(N) (FIG. 5A) is generated, at step 714. In a preferred embodiment, the high-resolution flags 514(1)-(N) (FIG. 5A) are a high alarm flag 514(1), a high warning flag 514(2), a low warning flag 514(3), and a low alarm flag 514(4), as shown in FIG. 5A.

Also in a preferred embodiment, the high alarm flag 514(1) (FIG. 5A) and the low alarm flag 514(4) are used to shut down at least part of the fiber optic transceiver, at step 716, by applying a signal to the internal TxDisable connection 418 (FIG. 4). The part of the fiber optic transceiver shut down preferably includes the laser driver 105 (FIG. 4) and/or the TOSA 103 (FIG. 4). The high and low warning flags 514(2) and 514(3) (FIG. 5A) preferably merely provide a warning to the host and do not shut down the laser driver 105 (FIG. 4) and/or the TOSA 103 (FIG. 4).

The alarm flags 514(1)-(N) (FIG. 5A) can be used to control the laser driver via the internal Tx Disable Output (Dout) and signal the fault to the host system via the Tx Fault Output (Fout). These outputs can also respond to the Tx Fault Input (Fin), if that signal exists in any given implementation, and the Tx Disable Input (Din) which comes into the fiber optic transceiver from the host.

In a preferred embodiment, the high-resolution alarm system 502 (FIG. 5A) updates the high-resolution alarm flags at a rate of approximately once every 0.015 seconds (15 milliseconds), and more generally at least 50 times per second. Thus, the high-resolution alarm flags are set within 0.015 seconds of the detection of an alarm condition. In some embodiments the high-resolution alarm flag update rate is between about 50 times per second and 200 times per second. However, the fast trip alarm system 504 (FIG. 5A) preferably updates the fast trip alarm flags a rate that is faster than once every 10 microseconds. In some embodiments the fast trip alarm system 504 updates the fast trip alarm flags at a rate that is between 50,000 and 200,000 times per second, and more generally at least 50,000 times per second. In a preferred embodiment, the alarm flags of the fast trip alarm system 504 are updated at a rate that is more than a thousand times faster than the update rate of the high-resolution alarm flags. In other embodiments the alarm flags of the fast trip alarm system 504 are updated at a rate that is between 250 and 4000 times faster than the update rate of the high-resolution alarm flags.

To further aid the above explanation, two examples are presented below, where a single point failure causes an eye safety fault condition that is detected, reported to a host coupled to the fiber optic transceiver, and/or a laser shutdown is performed.

EXAMPLE 1

The power monitor 422 (FIG. 4) in a fiber optic transceiver that includes a power monitor, or its associated circuitry, fails, indicating no or low output power when the laser is in fact operating. The laser bias driver will attempt to increase the transmitter output power by increasing laser bias current. Since the feedback is interrupted, the laser is driven to its maximum capability, perhaps exceeding the eye safety alarm setpoints. The fast trip alarm flag will be generated in less than 10 microseconds after the failure and this fast trip alarm flag can be used to shut down the laser driver via the internal Tx disable (Dout) output. If the fast trip alarm fails or is not selected in the output logic setup, the high-resolution alarm for laser bias current is generated, and the high-resolution low alarm for power would also occur, either of which could be used to shut down the laser driver and/or TOSA.

EXAMPLE 2

The laser driver (in all types of fiber optic transceiver), or its associated circuitry fails, driving the laser to its maximum output. Depending on the specific failure, the laser bias current may read zero or very high, and in a fiber optic transceiver that includes a power monitor, the power will read very high. The fast trip alarm for laser bias current, and the fast trip alarm for transmitted output power will generate an alarm flag within 10 microseconds. If the laser bias current is reading zero, the high-resolution low alarm for laser bias current will generate an alarm flag. This may be indistinguishable from a failure that causes zero light output, like an open laser wire or shorted laser, but the alarm systems preferably err on the side of safety and command the laser to shut down. In this condition, it may not be possible for the logic to physically turn the laser off, if, for example, the fault was caused by a shorted bias driver transistor. In any case, the link will be lost and the Tx fault output will be asserted to advise the host system of the failure. Depending on the configuration of the bias driver circuit, there are non-error conditions which could set some of these flags during a host-commanded transmit disable state, or during startup conditions. For example, if the host commands a transmitter shutdown, some circuits might read zero transmit power, as one would expect, and some might read very large transmit power as an artifact of the shutdown mechanism. When the laser is re-enabled, it takes a period of time for the control circuitry to stabilize, and during this time there may be erratic occurrences of both low, high and fast trip alarms. Programmable delay timers are preferably used to suppress the fault conditions during this time period.

While the combination of all of the above functions is desired in the preferred embodiment of this transceiver controller, it should be obvious to one skilled in the art that a device which only implements a subset of these functions would also be of great use. Similarly, the present invention is also applicable to transmitters and receivers, and thus is not solely applicable to transceivers. Finally, it should be pointed out that the controller of the present invention is suitable for application in multichannel optical links.

TABLE 1

| MEMORY MAP FOR TRANSCEIVER CONTROLLER | | |
|---|---|---|
| | Name of Location | Function |
| Memory Location (Array 0) | | |
| 00h-5Fh | IEEE Data | This memory block is used to store required GBIC data |
| 60h | Temperature MSB | This byte contains the MSB of the 15-bit 2's complement temperature output from the temperature sensor. |

TABLE 1-continued

MEMORY MAP FOR TRANSCEIVER CONTROLLER

| | Name of Location | Function |
|---|---|---|
| 61h | Temperature LSB | This byte contains the LSB of the 15-bit 2's complement temperature output from the temperature sensor. (LSB is 0b). |
| 62h-63h | $V_{cc}$ Value | These bytes contain the MSB (62h) and the LSB (63h) of the measured $V_{cc}$ (15-bit number, with a 0b LSbit) |
| 64h-65h | $B_{in}$ Value | These bytes contain the MSB (64h) and the LSB (65h) of the measured $B_{in}$ (15-bit number, with a 0b LSbit) |
| 66h-67h | $P_{in}$ Value | These bytes contain the MSB (66h) and the LSB (67h) of the measured $P_{in}$ (15-bit number, with a 0b LSbit) |
| 68h-69h | $R_{in}$ Value | These bytes contain the MSB (68h) and the LSB (69h) of the measured $R_{in}$ (15-bit number, with a 0b LSbit) |
| 6Ah-6Dh | Reserved | Reserved |
| 6Eh | IO States | This byte shows the logical value of the I/O pins. |
| 6Fh | A/D Updated | Allows the user to verify if an update from the A/D has occurred to the 5 values: temperature, Vcc, $B_{in}$, $P_{in}$, and $R_{in}$. The user writes the byte to 00h. Once a conversion is complete for a give value, its bit will change to '1'. |
| 70h-73h | Alarm Flags | These bits reflect the state of the alarms as a conversion updates. High alarm bits are '1' if converted value is greater than corresponding high limit. Low alarm bits are '1' if converted value is less than corresponding low limit. Otherwise, bits are 0b. |
| 74h-77h | Warning Flags | These bits reflect the state of the warnings as a conversion updates. High warning bits are '1' if converted value is greater than corresponding high limit. Low warning bits are '1' if converted value is less than corresponding low limit. Otherwise, bits are 0b. |
| 78h-7Ah | Reserved | Reserved |
| 7Bh-7Eh | Password Entry Bytes PWE Byte 3 (7Bh) MSByte PWE Byte 2 (7Ch) PWE Byte 1 (7Dh) PWE Byte 0 (7Eh) LSByte | The four bytes are used for password entry. The entered password will determine the user's read/write privileges. |
| 7Fh | Array Select | Writing to this byte determines which of the upper pages of memory is selected for reading and writing. 0xh (Array x Selected) Where x = 1, 2, 3, 4 or 5 |
| 80h-F7h | | Customer EEPROM |
| 87h | DA % Adj | Scale output of D/A converters by specified percentage |
| Memory Location (Array 1) | | |
| 00h-FFh Memory Location (Array 2) | | Data EEPROM |
| 00h-Ffh Memory Location (Array 3) | | Data EEPROM |
| 80h-81h 88h-89h 90h-91h 98h-99h A0h-A1h | Temperature High Alarm Vcc High Alarm $B_{in}$ High Alarm $P_{in}$ High Alarm $R_{in}$ High Alarm | The value written to this location serves as the high alarm limit. Data format is the same as the corresponding value (temperature, Vcc, $B_{in}$, $P_{in}$, $R_{in}$). |

TABLE 1-continued

MEMORY MAP FOR TRANSCEIVER CONTROLLER

| | Name of Location | Function |
|---|---|---|
| 82h-83h | Temperature Low Alarm | The value written to this location serves as the low alarm limit. Data format is the same as the corresponding value (temperature, Vcc, $B_{in}$, $P_{in}$, $R_{in}$). |
| 8Ah-8Bh | Vcc Low Alarm | |
| 92h-93h | $B_{in}$ Low Alarm | |
| 9Ah-9Bh | $P_{in}$ Low Alarm | |
| A2h-A3h | $R_{in}$ Low Alarm | |
| 84h-85h | Temp High Warning | The value written to this location serves as the high warning limit. Data format is the same as the corresponding value (temperature, Vcc, $B_{in}$, $P_{in}$, $R_{in}$). |
| 8Ch-8Dh | Vcc High Warning | |
| 94h-95h | $B_{in}$ High Warning | |
| 9Ch-9Dh | $P_{in}$ High Warning | |
| A4h-A5h | $R_{in}$ High Warning | |
| 86h-87h | Temperature Low Warning | The value written to this location serves as the low warning limit. Data format is the same as the corresponding value (temperature, Vcc, $B_{in}$, $P_{in}$, $R_{in}$). |
| 8Eh-8Fh | Vcc Low Warning | |
| 96h-97h | $B_{in}$ Low Warning | |
| 9Eh-9Fh | $P_{in}$ Low Warning | |
| A6h-A7h | $R_{in}$ Low Warning | |
| A8h-AFh | $D_{out}$ control 0-8 | Individual bit locations are defined in Table 4. |
| C5h | $F_{out}$ control 0-8 | |
| B0h-B7h, C6h | $L_{out}$ control 0-8 | |
| B8h-BFh, C7h | | |
| C0h | Reserved | Reserved |
| C1h | Prescale | Selects MCLK divisor for X-delay CLKS. |
| C2h | $D_{out}$ Delay | Selects number of prescale clocks |
| C3h | $F_{out}$ Delay | |
| C4h | $L_{out}$ Delay | |
| C8h-C9h | Vcc-A/D Scale | 16 bits of gain adjustment for corresponding A/D conversion values. |
| CAh-CBh | $B_{in}$-A/D Scale | |
| CCh-CDh | $P_{in}$-A/D Scale | |
| CEh-CFh | $R_{in}$-A/D Scale | |
| D0h | Chip Address | Selects chip address when external pin ASEL is low. |
| D1h | Margin #2 | Finisar Selective Percentage (FSP) for D/A #2 |
| D2h | Margin #1 | Finisar Selective Percentage (FSP) for D/A #1 |
| D3h-D6h | PW1 Byte 3 (D3h) MSB PW1 Byte 2 (D4h) PW1 Byte 1 (D5h) PW1 Byte 0 (D6h) LSB | The four bytes are used for password 1 entry. The entered password will determine the Finisar customer's read/write privileges. |
| D7h | D/A Control | This byte determines if the D/A outputs source or sink current, and it allows for the outputs to be scaled. |
| D8h-DFh | $B_{in}$ Fast Trip | These bytes define the fast trip comparison over temperature. |
| E0h-E3h | $P_{in}$ Fast Trip | These bytes define the fast trip comparison over temperature. |
| E4h-E7h | $R_{in}$ Fast Trip | These bytes define the fast trip comparison over temperature. |
| E8h | Configuration Override Byte | Location of the bits is defined in Table 4 |
| E9h | Reserved | Reserved |
| EAh-EBh | Internal State Bytes | Location of the bits is defined in Table 4 |
| ECh | I/O States 1 | Location of the bits is defined in Table 4 |
| EDh-EEh | D/A Out | Magnitude of the temperature compensated D/A outputs |
| EFh | Temperature Index | Address pointer to the look-up Arrays |
| F0h-FFh | Reserved | Reserved |
| Memory Location (Array 4) | | |
| 00h-Ffh | | D/A Current vs. Temp #1 (User-Defined Look-up Array #1) |
| Memory Location (Array 5) | | |
| 00h-Ffh | | D/A Current vs. Temp #2 (User-Defined Look-up Array #2) |

TABLE 2

DETAIL MEMORY DESCRIPTIONS-A/D VALUES AND STATUS BITS

| Byte | Bit | Name | Description |
|---|---|---|---|
| \multicolumn{4}{c}{Converted analog values. Calibrated 16 bit data. (See Notes 1-2)} ||||
| 96 (60h) | All | Temperature MSB | Signed 2's complement integer temperature (−40 to +125 C.) |
| 97 | All | Temperature LSB | Based on internal temperature measurement Fractional part of temperature (count/256) |
| 98 | All | Vcc MSB | Internally measured supply voltage in transceiver. Actual voltage is full 16 bit value * 100 uVolt. |
| 99 | All | Vcc LSB | (Yields range of 0-6.55 V) |
| 100 | All | TX Bias MSB | Measured TX Bias Current in mA Bias current is full 16 bit value * (1/256) mA. |
| 101 | All | TX Bias LSB | (Full range of 0-256 mA possible with 4 uA resolution) |
| 102 | All | TX Power MSB | Measured TX output power in mW. Output is full 16 bit value * (1/2048) mW. (see note 5) |
| 103 | All | TX Power LSB | (Full range of 0-32 mW possible with 0.5 μW resolution, or −33 to +15 dBm) |
| 104 | All | RX Power MSB | Measured RX input power in mW RX power is full 16 bit value * (1/16384) mW. (see note 6) |
| 105 | All | RX Power LSB | (Full range of 0-4 mW possible with 0.06 μW resolution, or −42 to +6 dBm) |
| 106 | All | Reserved MSB | Reserved for 1st future definition of digitized analog input |
| 107 | All | Reserved LSB | Reserved for 1st future definition of digitized analog input |
| 108 | All | Reserved MSB | Reserved for 2nd future definition of digitized analog input |
| 109 | All | Reserved LSB | Reserved for 2nd future definition of digitized analog input |
| 110 | 7 | TX Disable | Digital state of the TX Disable Input Pin |
| 110 | 6 | Reserved | |
| 110 | 5 | Reserved | |
| 110 | 4 | Rate Select | Digital state of the SFP Rate Select Input Pin |
| 110 | 3 | Reserved | |
| 110 | 2 | TX Fault | Digital state of the TX Fault Output Pin |
| 110 | 1 | LOS | Digital state of the LOS Output Pin |
| 110 | 0 | Power-On-Logic | Indicates transceiver has achieved power up and data valid |
| 111 | 7 | Temp A/D Valid | Indicates A/D value in Bytes 96/97 is valid |
| 111 | 6 | Vcc A/D Valid | Indicates A/D value in Bytes 98/99 is valid |
| 111 | 5 | TX Bias A/D Valid | Indicates A/D value in Bytes 100/101 is valid |
| 111 | 4 | TX Power A/D Valid | Indicates A/D value in Bytes 102/103 is valid |
| 111 | 3 | RX Power A/D Valid | Indicates A/D value in Bytes 104/105 is valid |
| 111 | 2 | Reserved | Indicates A/D value in Bytes 106/107 is valid |
| 111 | 1 | Reserved | Indicates A/D value in Bytes 108/109 is valid |
| 111 | 0 | Reserved | Reserved |

TABLE 3

DETAIL MEMORY DESCRIPTIONS-ALARM AND WARNING FLAG BITS
Alarm and Warning Flag Bits

| Byte | Bit | Name | Description |
|---|---|---|---|
| 112 | 7 | Temp High Alarm | Set when internal temperature exceeds high alarm level. |
| 112 | 6 | Temp Low Alarm | Set when internal temperature is below low alarm level. |
| 112 | 5 | Vcc High Alarm | Set when internal supply voltage exceeds high alarm level. |
| 112 | 4 | Vcc Low Alarm | Set when internal supply voltage is below low alarm level. |
| 112 | 3 | TX Bias High Alarm | Set when TX Bias current exceeds high alarm level. |
| 112 | 2 | TX Bias Low Alarm | Set when TX Bias current is below low alarm level. |
| 112 | 1 | TX Power High Alarm | Set when TX output power exceeds high alarm level. |
| 112 | 0 | TX Power Low Alarm | Set when TX output power is below low alarm level. |
| 113 | 7 | RX Power High Alarm | Set when Received Power exceeds high alarm level. |
| 113 | 6 | RX Power Low Alarm | Set when Received Power is below low alarm level. |
| 113 | 5-0 | Reserved Alarm | |
| 114 | All | Reserved | |
| 115 | All | Reserved | |
| 116 | 7 | Temp High Warning | Set when internal temperature exceeds high warning level. |
| 116 | 6 | Temp Low Warning | Set when internal temperature is below low warning level. |
| 116 | 5 | Vcc High Warning | Set when internal supply voltage exceeds high warning level. |
| 116 | 4 | Vcc Low Warning | Set when internal supply voltage is below low warning level. |
| 116 | 3 | TX Bias High Warning | Set when TX Bias current exceeds high warning level. |
| 116 | 2 | TX Bias Low Warning | Set when TX Bias current is below low warning level. |
| 116 | 1 | TX Power High Warning | Set when TX output power exceeds high warning level. |
| 116 | 0 | TX Power Low Warning | Set when TX output power is below low warning level. |
| 117 | 7 | RX Power High Warning | Set when Received Power exceeds high warning level. |
| 117 | 6 | RX Power Low Warning | Set when Received Power is below low warning level. |
| 117 | 5 | Reserved Warning | |
| 117 | 4 | Reserved Warning | |
| 117 | 3 | Reserved Warning | |
| 117 | 2 | Reserved Warning | |
| 117 | 1 | Reserved Warning | |
| 117 | 0 | Reserved Warning | |
| 118 | All | Reserved | |
| 119 | All | Reserved | |

TABLE 4

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cntl0 | T alrm hi set | T alrm lo set | V alrm hi set | V alrm lo set | B alrm hi set | B alrm lo set | P alrm hi set | P alrm lo set |
| X-out cntl1 | R alrm hi set | R alrm lo set | B ft hi set | P ft hi set | R ft hi set | D-in inv set | D-in set | F-in inv set |
| X-out cntl2 | F-in set | L-in inv set | L-in set | Aux inv set | Aux set | T alrm hi hib | T alrm lo hib | V alrm hi hib |
| X-out cntl3 | V alrm lo hib | B alrm hi hib | B alrm lo hib | P alrm hi hib | P alrm lo hib | R alrm hi hib | R alrm lo hib | B ft hi hib |
| X-out cntl4 | P ft hi hib | R ft hi hib | D-in inv hib | D-in hib | F-in inv hib | F-in hib | L-in inv hib | L-in hib |
| X-out cntl5 | Aux inv hib | Aux hib | T alrm hi clr | T alrm lo clr | V alrm hi clr | V alrm lo clr | B alrm hi clr | B alrm lo clr |
| X-out cntl6 | P alrm hi clr | P alrm lo clr | R alrm hi clr | R alrm lo clr | B ft hi clr | P ft hi clr | R ft hi clr | D-in inv clr |
| X-out cntl7 | D-in clr | F-in inv clr | F-in clr | L-in inv clr | L-in clr | Aux inv clr | Aux clr | EE |
| X-out cntl8 | latch select | invert | o-ride data | o-ride select | S reset data | HI enable | LO enable | Pullup enable |
| Prescale | reserved | reserved | Reserved | reserved | $B^3$ | $B^2$ | $B^1$ | $B^0$ |
| X-out delay | $B^7$ | $B^6$ | $B^5$ | $B^4$ | $B^3$ | $B^2$ | $B^1$ | $B^0$ |
| chip address | $b^7$ | $b^6$ | $b^5$ | $b^4$ | $b^3$ | $b^2$ | $b^1$ | X |
| X-ad scale MSB | $2^{15}$ | $2^{14}$ | $2^{13}$ | $2^{12}$ | $2^{11}$ | $2^{10}$ | $2^9$ | $2^8$ |
| X-ad scale LSB | $2^7$ | $2^6$ | $2^5$ | $2^4$ | $2^3$ | $2^2$ | $2^1$ | $2^0$ |

| | \multicolumn{8}{c}{D/A cntl} |
|---|---|---|---|---|---|---|---|---|
| | source/sink | D/A #2 range | | | source/sink | D/A #1 range | | |
| | 1/0 | $2^2$ | $2^1$ | $2^0$ | 1/0 | $2^2$ | $2^1$ | $2^0$ |
| config/O-ride | manual D/A | manual index | manual AD alarm | EE Bar | SW-POR | A/D Enable | Manual fast alarm | reserved |
| Internal State 1 | D-set | D-inhibit | D-delay | D-clear | F-set | F-inhibit | F-delay | F-clear |
| Internal State 0 | L-set | L-inhibit | L-delay | L-clear | reserved | reserved | reserved | reserved |
| I/O States 1 | reserved | F-in | L-in | reserved | D-out | reserved | reserved | reserved |
| Margin #1 | Reserved | Neg_Scale2 | Neg_Scale1 | Neg_Scale0 | Reserved | Pos_Scale2 | Pos_Scale1 | Pos_Scale0 |
| Margin #2 | Reserved | Neg_Scale2 | Neg_Scale1 | Neg_Scale0 | Reserved | Pos_Scale2 | Pos_Scale1 | Pos_Scale0 |

What is claimed is:

1. A circuit for monitoring operation of an optoelectronic transceiver, said circuit comprising:
    a housing at least partially enclosing:
    a laser transmitter and a photodiode receiver:
    analog to digital conversion circuitry configured to convert a first analog signal corresponding to a first operating condition of said optoelectronic transceiver into a first digital value, and convert a second analog signal corresponding to a second operating condition of said optoelectronic transceiver into a second digital value;
    memory configured to store the first and second digital values;
    an interface configured to enable a host external to the optoelectronic transceiver to access the first and second digital values; and
    one or more internal logic circuits coupled to the memory and configured to read from or write to the memory at least one of the first and second digital values;
    wherein the circuit is configured to receive a disable command signal from the host to disable the laser transmitter.

2. The circuit of claim 1, wherein the first digital value is selected from a group consisting of: a supply voltage measurement, a laser temperature measurement, a laser wavelength measurement, and a thermoelectric cooler current measurement.

3. The circuit of claim 1, wherein the first digital value includes a supply voltage measurement.

4. The circuit of claim 1, wherein the first digital value includes a laser temperature measurement.

5. The circuit of claim 1, wherein the first digital value includes a laser wavelength measurement.

6. The circuit of claim 1, wherein the first digital value includes a thermoelectric cooler current measurement.

7. The circuit of claim 1, further comprising a processor configured to store the first digital value in a first memory location and to store the second digital value in a second memory location.

8. The circuit of claim 7, wherein the processor is further configured to access the first digital value in the first memory location and to access the second digital value in the second memory location.

9. A circuit for monitoring operation of an optoelectronic transceiver, said circuit comprising:
    a housing at least partially enclosing:
    a laser transmitter and a photodiode receiver:
    analog to digital conversion circuitry configured to convert a first analog signal corresponding to a first operating condition of said optoelectronic transceiver into a first digital value, and convert a second analog signal corresponding to a second operating condition of said optoelectronic transceiver into a second digital value;

memory configured to store the first and second digital values;

an interface configured to enable a host external to the optoelectronic transceiver to access the first and second digital values; and a processor configured to access the first digital value in response to receiving a first address from the host and to access the second digital value in response to receiving a second address from the host.

10. The circuit of claim 9, wherein the processor is further configured to provide the digital values accessed by the processor to the host via the interface.

11. The circuit of claim 1, wherein the circuit further comprises control circuitry configured to generate control signals to control operation of the optoelectronic transceiver in accordance with one or more of the first digital value and the second digital value.

12. The circuit of claim 1, wherein the circuit further comprises operation disable circuitry configured to disable operation of at least part of the optoelectronic transceiver in response to a signal, wherein the signal is based on one or more of the first digital value and the second digital value.

13. A circuit for monitoring operation of an optoelectronic transceiver, said circuit comprising:
a housing at least partially enclosing:
a laser transmitter and a photodiode receiver:
analog to digital conversion circuitry configured to convert a first analog signal corresponding to a first operating condition of said optoelectronic transceiver into a first digital value, and convert a second analog signal corresponding to a second operating condition of said optoelectronic transceiver into a second digital value;
memory configured to store the first and second digital values;
an interface configured to enable a host external to the optoelectronic transceiver to access the first and second digital values; and
rate selection circuitry configured to set the photodiode receiver to a bandwidth in response to a signal, wherein the signal is based on one or more of the first digital value and the second digital value.

14. A circuit for monitoring operation of an optoelectronic transceiver, said circuit comprising:
a housing at least partially enclosing:
a laser transmitter and a photodiode receiver:
analog to digital conversion circuitry configured to convert a first analog signal corresponding to a first operating condition of said optoelectronic transceiver into a first digital value, and convert a second analog signal corresponding to a second operating condition of said optoelectronic transceiver into a second digital value;
memory configured to store the first and second digital values;
comparison logic configured to compare the first digital value with a first limit value to generate a first flag value and to compare the second digital value with a second limit value to generate a second flag value, wherein the first and second flag values are stored in memory;
an interface configured to enable the host to access the first and second digital values and the first and second flag values; and
one or more internal logic circuits coupled to the memory and configured to read from or write to the memory at least one of the first digital value, the second digital value, the first flag value and the second flag value;
wherein the circuit is configured to receive a disable command signal from the host to disable the laser transmitter.

15. The circuit of claim 14, further comprising a processor configured to store the first digital value in a first memory location, to store the second digital value in a second memory location, to store the first flag value in a first flag memory address, and to store the second flag value in a second flag memory address.

16. The circuit of claim 15, wherein the processor is further configured to access the first digital value in the first memory location, to access the second digital value in the second memory location, to access the first flag value in the first flag memory address, and to access the second flag value in the second flag memory address.

17. A circuit for monitoring operation of an optoelectronic transceiver, said circuit comprising:
a housing at least partially enclosing:
a laser transmitter and a photodiode receiver:
analog to digital conversion circuitry configured to convert a first analog signal corresponding to a first operating condition of said optoelectronic transceiver into a first digital value, and convert a second analog signal corresponding to a second operating condition of said optoelectronic transceiver into a second digital value;
memory configured to store the first and second digital values;
comparison logic configured to compare the first digital value with a first limit value to generate a first flag value and to compare the second digital value with a second limit value to generate a second flag value, wherein the first and second flag values are stored in memory;
an interface configured to enable the host to access the first and second digital values and the first and second flag values; and
a processor configured to access the first digital value in response to receiving a first address from the host, to access the second digital value in response to receiving a second address from the host, to access the first flag value in response to receiving a first flag memory address, and to access the second flag value in response to receiving a second flag memory address.

18. The circuit of claim 17, wherein the processor is further configured to provide the digital and flag values accessed by the processor to the host via the interface.

19. A circuit for monitoring operation of an optoelectronic transceiver, said circuit comprising:
a housing at least partially enclosing:
a laser transmitter and a photodiode receiver:
analog to digital conversion circuitry configured to convert a first analog signal corresponding to a first operating condition of said optoelectronic transceiver into a first digital value, and convert a second analog signal corresponding to a second operating condition of said optoelectronic transceiver into a second digital value;
memory configured to store the first and second digital values;
comparison logic configured to compare the first digital value with a first limit value to generate a first flag value and to compare the second digital value with a second limit value to generate a second flag value, wherein the first and second flag values are stored in memory;
an interface configured to enable the host to access the first and second digital values and the first and second flag values; and control circuitry configured to generate control signals to control operation of the optoelectronic transceiver in accordance with one or more of the first flag value and the second flag value.

20. A circuit for monitoring operation of an optoelectronic transceiver, said circuit comprising:
a housing at least partially enclosing:
a laser transmitter and a photodiode receiver;
analog to digital conversion circuitry configured to convert a first analog signal corresponding to a first operating condition of said optoelectronic transceiver into a first digital value, and convert a second analog signal corresponding to a second operating condition of said optoelectronic transceiver into a second digital value;
memory configured to store the first and second digital values;
comparison logic configured to compare the first digital value with a first limit value to generate a first flag value and to compare the second digital value with a second limit value to generate a second flag value, wherein the first and second flag values are stored in memory;
an interface configured to enable the host to access the first and second digital values and the first and second flag values; and
operation disable circuitry configured to disable operation of at least part of the optoelectronic transceiver in response to a signal, wherein the signal is based on one or more of the first flag value and the second flag value.

21. The circuit of claim 9, wherein the first digital value is selected from a group consisting of: a supply voltage measurement, a laser temperature measurement, a laser wavelength measurement, and a thermoelectric cooler current measurement.

22. The circuit of claim 9, wherein the first digital value includes a supply voltage measurement.

23. The circuit of claim 9, wherein the first digital value includes a laser temperature measurement.

24. The circuit of claim 9, wherein the first digital value includes a laser wavelength measurement.

25. The circuit of claim 9, wherein the first digital value includes a thermoelectric cooler current measurement.

26. The circuit of claim 9, further comprising a processor configured to store the first digital value in a first memory location and to store the second digital value in a second memory location.

27. The circuit of claim 26, wherein the processor is further configured to access the first digital value in the first memory location and to access the second digital value in the second memory location.

28. The circuit of claim 9, wherein the circuit further comprises control circuitry configured to generate control signals to control operation of the optoelectronic transceiver in accordance with one or more of the first digital value and the second digital value.

29. The circuit of claim 9, wherein the circuit further comprises operation disable circuitry configured to disable operation of at least part of the optoelectronic transceiver in response to a signal, wherein the signal is based on one or more of the first digital value and the second digital value.

30. The circuit of claim 13, wherein the first digital value is selected from a group consisting of: a supply voltage measurement, a laser temperature measurement, a laser wavelength measurement, and a thermoelectric cooler current measurement.

31. The circuit of claim 13, wherein the first digital value includes a supply voltage measurement.

32. The circuit of claim 13, wherein the first digital value includes a laser temperature measurement.

33. The circuit of claim 13, wherein the first digital value includes a laser wavelength measurement.

34. The circuit of claim 13, wherein the first digital value includes a thermoelectric cooler current measurement.

35. The circuit of claim 13, further comprising a processor configured to store the first digital value in a first memory location and to store the second digital value in a second memory location.

36. The circuit of claim 35, wherein the processor is further configured to access the first digital value in the first memory location and to access the second digital value in the second memory location.

37. The circuit of claim 13, wherein the circuit further comprises control circuitry configured to generate control signals to control operation of the optoelectronic transceiver in accordance with one or more of the first digital value and the second digital value.

38. The circuit of claim 13, wherein the circuit further comprises operation disable circuitry configured to disable operation of at least part of the optoelectronic transceiver in response to a signal, wherein the signal is based on one or more of the first digital value and the second digital value.

39. The circuit of claim 17, further comprising a processor configured to store the first digital value in a first memory location, to store the second digital value in a second memory location, to store the first flag value in a first flag memory address, and to store the second flag value in a second flag memory address.

40. The circuit of claim 19, further comprising a processor configured to store the first digital value in a first memory location, to store the second digital value in a second memory location, to store the first flag value in a first flag memory address, and to store the second flag value in a second flag memory address.

41. The circuit of claim 40, wherein the processor is further configured to access the first digital value in the first memory location, to access the second digital value in the second memory location, to access the first flag value in the first flag memory address, and to access the second flag value in the second flag memory address.

42. The circuit of claim 20, further comprising a processor configured to store the first digital value in a first memory location, to store the second digital value in a second memory location, to store the first flag value in a first flag memory address, and to store the second flag value in a second flag memory address.

43. The circuit of claim 42, wherein the processor is further configured to access the first digital value in the first memory location, to access the second digital value in the second memory location, to access the first flag value in the first flag memory address, and to access the second flag value in the second flag memory address.

* * * * *